US012547119B2

(12) United States Patent
Joachim et al.

(10) Patent No.: US 12,547,119 B2
(45) Date of Patent: Feb. 10, 2026

(54) HOROLOGICAL SWITCHABLE DISPLAY MECHANISM

(71) Applicant: Glashütter Uhrenbetrieb GmbH, Glashütte/Sachsen (DE)

(72) Inventors: Max Joachim, Dresden (DE); Tony Braun, Müglitztal (DE)

(73) Assignee: GLASHÜTTER Uhrenbetrieb GmbH, Glashütte/Sachsen (DE)

( * ) Notice: Subject to any disclaimer, the term of this patent is extended or adjusted under 35 U.S.C. 154(b) by 437 days.

(21) Appl. No.: 18/165,999

(22) Filed: Feb. 8, 2023

(65) Prior Publication Data

US 2023/0350347 A1 Nov. 2, 2023

(30) Foreign Application Priority Data

Apr. 29, 2022 (EP) .................................... 22170936

(51) Int. Cl.
*G04B 19/02* (2006.01)

(52) U.S. Cl.
CPC .................................... *G04B 19/02* (2013.01)

(58) Field of Classification Search
None
See application file for complete search history.

(56) References Cited

U.S. PATENT DOCUMENTS

2008/0304370 A1 12/2008 Scheufele
2009/0310445 A1* 12/2009 Laucella ................ G04B 19/02 368/220
2011/0205852 A1* 8/2011 Zaugg .................. G04B 19/223 368/21
2014/0321247 A1 10/2014 Cattaneo et al.

FOREIGN PATENT DOCUMENTS

EP 1 959 317 A1 8/2008

OTHER PUBLICATIONS

European Search Report for EP 22 17 0936 dated Oct. 14, 2022.

* cited by examiner

*Primary Examiner* — Renee S Luebke
*Assistant Examiner* — Matthew Daniel Hwang
(74) *Attorney, Agent, or Firm* — Sughrue Mion, PLLC

(57) ABSTRACT

A horological mechanism (1000) with a first train (100) and a first output wheel set (101), a second train (200) and a second output wheel set (102), for alternately displaying on a display (800, 8, 28) a first and a second indication respectively specific to the first train and second train, by a switching and coupling mechanism (500), including two input wheel sets (1; 2) connected to the output wheel sets, which includes a sliding wheel set (5) capable of moving under constant strain between the two input wheel sets, and cooperating alternately and exclusively with either one, selected under the action of a command from a user, to establish a driving connection between the input wheel set engaged with the sliding wheel set at the given moment in time, and a display (800, 8, 28) to produce a switchable display.

19 Claims, 18 Drawing Sheets

HOROLOGICAL SWITCHABLE DISPLAY MECHANISM

CROSS REFERENCE TO RELATED APPLICATION

This application claims priority to European Patent Application No. 22170936.3 filed Apr. 29, 2022, the entire contents of which are incorporated herein by reference.

TECHNICAL FIELD OF THE INVENTION

The invention relates to a horological mechanism comprising a first mechanism, in particular a first train, with a first output wheel set capable of moving by pivoting, and a second mechanism, in particular a second train, with a second output wheel set capable of moving by pivoting, which are arranged to control the motion of a third mechanism, in particular a display mechanism, for the respective, alternating display, on at least one display means, of a first and of a second indication specific to the first mechanism and to the second mechanism respectively.

The invention further relates to a timepiece comprising at least one such horological mechanism.

The invention relates to the field of horological complications, and more particularly to the field of horological displays.

TECHNOLOGICAL BACKGROUND

Switching between different displays is a popular complication for timepiece enthusiasts, which requires a large amount of space inside a mechanical timepiece, due to the additional mechanisms and trains that are added to those of a basic display. The most well-known applications involve switching between a time display and a countdown display on a chronograph, or changing time zones.

The complexity of these mechanisms is such that such switching mechanisms are typically dedicated to a single application, and it is difficult to modify them to design other display changes.

SUMMARY OF THE INVENTION

The aim of the invention is to develop a switching mechanism, in particular a display switching mechanism, which is as universal as possible and which allows it to be used for a wide variety of applications. This switching mechanism is designed in a simple way, avoiding the need to use expensive and fragile differential elements, which are often used in switching mechanisms. The need to use relative positioning elements, such as heart-pieces, is also avoided.

For this purpose, the invention relates to a horological mechanism according to claim 1.

The invention further relates to a timepiece comprising at least one such horological mechanism.

BRIEF DESCRIPTION OF THE FIGURES

The aims, advantages and features of the invention will become more apparent upon reading the following detailed description, with reference to the accompanying drawings, among which:

FIG. 9 with the support pin between the rigid spring-holding element and the supporting edge, which causes the distal end of the spring to move upwards in the figure, and the groove of the sliding wheel set to be driven axially upwards in the figure;

FIG. 10 with the support pin beyond the supporting edge, which causes the distal end of the spring to move downwards in the figure, and the groove of the sliding wheel set to be driven axially downwards in the figure, in the opposite direction to that in FIG. 9;

DETAILED DESCRIPTION OF THE INVENTION

Figure 1:
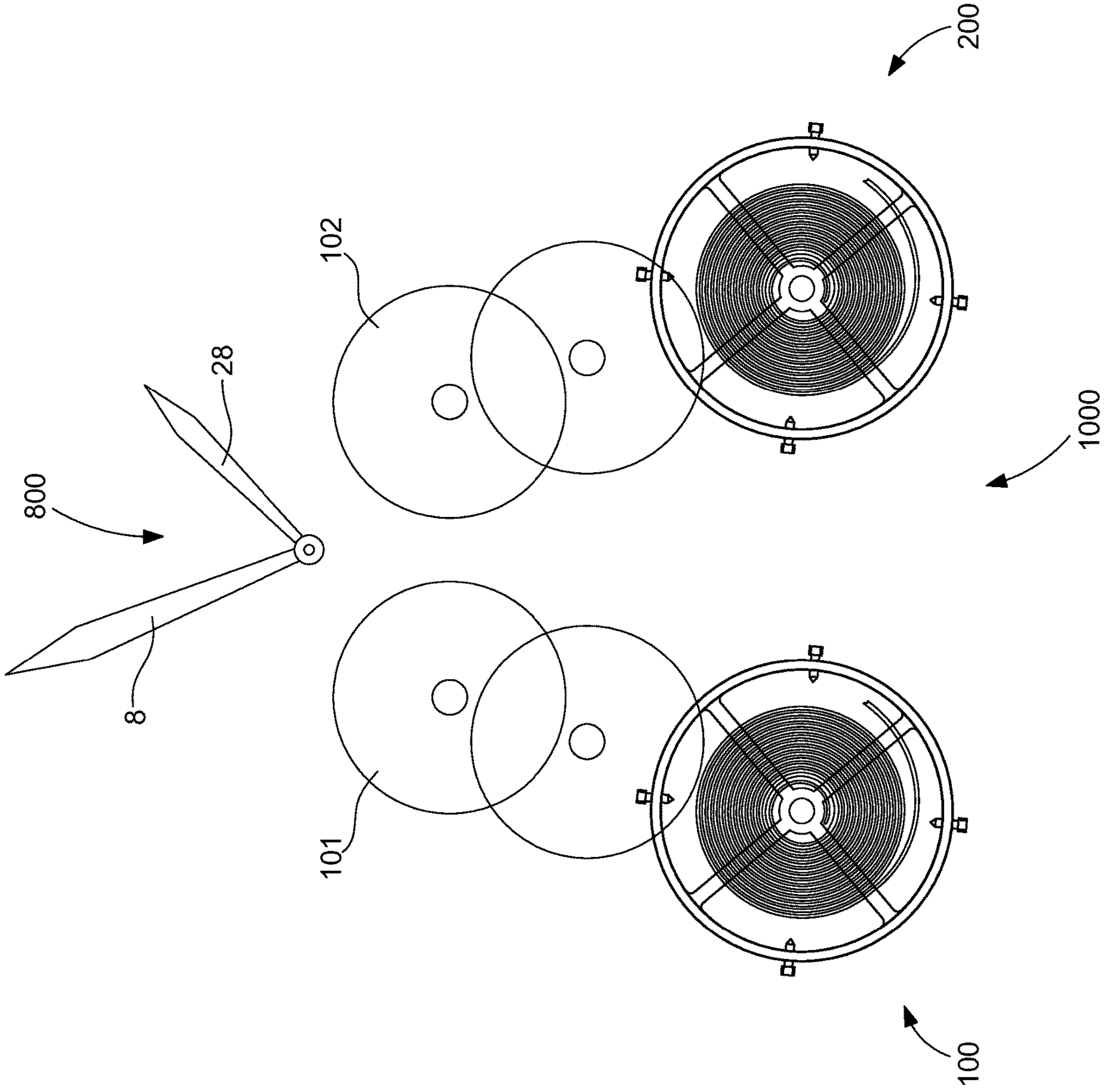
FIG. 1 diagrammatically shows a plan view of a conventional display mechanism such as a set of hands, which is arranged, within the scope of a specific and non-limiting application of the invention, to cooperate with either one of two mechanisms, in particular two trains. This figure shows a specific case where each of these trains is an output of an oscillator, and where the two oscillators can have very different features.

The invention relates to the production of a switchable display for a timepiece, in particular but not limited to a watch.

More particularly, the invention relates to a horological mechanism 1000, which comprises a first mechanism 100, in particular but not limited to a first train, comprising a first output wheel set 101 capable of pivoting, and a second mechanism 200, in particular a second train, comprising a second output wheel set 102 capable of pivoting.

The position of the first output wheel set 101 is associated with a first input variable, and the position of the second output wheel set 102 is associated with a second input variable.

This first mechanism 100 and this second mechanism 200 are arranged to control, each in turn, the motion of a third mechanism, and the driving of at least a third output wheel set comprised in this third mechanism. In the example shown in the figures, this third mechanism is a display mechanism capable of displaying the value of the first input variable, or of the second input variable, according to a selection made by the user.

In particular, these output wheel sets 101 and 102 are arranged to control the respective display, on at least one display means 800, 8, 28, alternately of a first and of a second indication specific to the first train 100 and to the second train 200 respectively.

More particularly, this first mechanism 100 and this second mechanism 200 operate continuously, independently of one another, although they can, for example, be powered by a single energy source.

According to the invention, the horological mechanism 1000 comprises a switching and coupling mechanism 500, which is arranged for the alternating and exclusive coupling between, on the one hand, the first mechanism 100 or the second mechanism 200, which constitute two inputs each more particularly operating continuously, and on the other hand, the third mechanism constituting an output.

More particularly, this switching and coupling mechanism 500 comprises two input wheel sets 1, 2, each constituted by an output wheel set 101, 102, or driven directly by an output wheel set 101, 102. This switching and coupling mechanism 500 comprises a sliding wheel set 5, which is capable of moving axially under constant strain between the two input wheel sets 1, 2, which sliding wheel set 5 is arranged to cooperate alternately and exclusively with either one of the two input wheel sets 1, 2, which wheel set is selected under the action of a command imparted by a user to a control means 300 comprised in the horological mechanism, to establish a driving connection between the input wheel set 1, 2, engaged with the sliding wheel set 5 at the given moment in time, in particular in the application of a switchable display with a display means 800, 8, 28.

More particularly, the sliding wheel set 5 and the two input wheel sets 1, 2 are coaxial around a slide axis D1. The sliding wheel set 5 can be axially coupled with only one of the two input wheel sets 1, 2 at a time, by the cooperation of complementary reliefs in a single relative angular position for each input wheel set 1, 2.

The sliding wheel set 5 is held in the coupling position thereof by at least one spring or lever comprised in the control means 300 and which is arranged to control and then hold the axial position of the sliding wheel set 5.

This control means 300 is further arranged to impart rotational travel to the sliding wheel set 5, to find the first coupling position between the sliding wheel set 5 and the wheel set towards which it is pushed.

The user can operate the control means 300 to uncouple the mechanism from among the first mechanism 100 and the second mechanism 200 that is engaged with the third mechanism, and then to engage the other from among the first mechanism 100 and the second mechanism 200 with this third mechanism.

More particularly, the switching and coupling mechanism 500 comprises a structure 600, which comprises a raised edge 10, with which a strip 9 comprised in the control means 300 cooperates via abutment in order to modify the position of a sliding wheel set 5 comprised in this switching and coupling mechanism 500.

More particularly, the sliding wheel set 5 is a sliding coupling sleeve coaxial with, on the one hand, a first hub 3 frictionally driven by the first input wheel set 1, in particular by means of resilient arms 13, and on the other hand, a second hub 4 frictionally driven by the second input wheel set 2, in particular by means of resilient arms 24, and the first input wheel set 1 or respectively the second input wheel set 2 is arranged to drive the first hub 3 or respectively the second hub 4.

This sliding wheel set 5 is arranged to cooperate alternately and exclusively, by frontal clicking in a single position per revolution, with either one of the two input wheel sets 1 or 2, which is selected under the action of a command imparted by the user to the control means 3000, to establish a driving connection between, on the one hand, the input wheel set 1, 2, which is engaged with the sliding wheel set 5 at the given moment in time, and, on the other hand, a third output wheel set in order to cause it to pivot by a stroke that is characteristic, as the case may be, of the first input variable or of the second input variable. In one advantageous application, the third output wheel set belongs to the third mechanism which is a display mechanism.

The invention is described for the specific and non-limiting case of switching a minutes display and for switching an hours display, these names being used here to designate the various components. It goes without saying that the invention is also applicable to a switching of the display of other horological variables, for example GMT, calendar, or the like, or to a switching mechanism for the transmission of a force, a command, or the like, the display being a specific, non-limiting example application of the invention.

This first hub 3 and this second hub 4 respectively comprise a first coupling element 301 and a second coupling element 401, which are arranged to cooperate alternately in the coupling position, one at a time, with a first complementary coupling element 5301 or with a second complementary coupling element 5401 comprised in the sliding wheel set 5.

Moreover, the control means 300 is arranged to impart axial travel to the sliding wheel set 5 as far as abutment against the first hub 3 or respectively against the second hub 4, and to impart rotational travel to the sliding wheel set 5 to find the first coupling position between the sliding wheel set 5 and the first hub 3, or respectively the second hub 4, towards which it is pushed.

More particularly, the switching and coupling mechanism 500 comprises at least one resilient return means 900, 9, which is arranged to axially push the sliding wheel set 5 to abut against the first hub 3, or respectively the second hub 4, towards which it is pushed.

More particularly, the first coupling element 301 and the second coupling element 401 are respectively a first claw element and a second claw element, which are arranged to alternately cooperate in a clawing position, one at a time, with the first complementary coupling element 5301 or with the second complementary coupling element 5401, which are respectively a first complementary claw element and a second complementary claw element.

More particularly, the control means 300 is arranged to impart rotational travel to an intermediate wheel 7 integral with the sliding wheel set 5 for rotation therewith, to find a coupling position between the sliding wheel set 5 and the first hub 3 or the second hub 4 towards which it is pushed.

More particularly, the sliding wheel set 5 comprises, on a first face facing the first hub 3, and on a second face facing the second hub 4, at least one post, or respectively one groove, which is arranged to cooperate in a complementary manner with a groove, or respectively a post, comprised in the first hub 3, and respectively the second hub 4, in a single cooperation position during a relative rotation of less than or equal to 360°, during the rotational travel of the sliding wheel set 5.

More particularly, the sliding wheel set 5 is mounted such that it slides on an arbor 6 with which it is rotationally indexed, which arbor 6 is arranged to cause, either directly or indirectly, a display means 800, 8, 28 to rotate.

More particularly, this arbor 6 is arranged to cause a display means 800, 8, 28 to rotate, through a train incorporating the intermediate wheel 7, or through the intermediate wheel 7, which is rotationally indexed with the arbor 6.

More particularly, the switching and coupling mechanism 500 comprises a structure 600, to which this at least one resilient return means 900, 9 is fixed via a rigid holding element 14. The resilient return means comprises at least one main spring strip 9, which is supported on an edge 10 comprised in the structure 600, and comprises a spring control lever 12, which is mounted such that it pivots by means of a guide block 1200 inserted in the plate 600, and which can be operated by the control means 300. This spring control lever 12 carries a support pin 11, which is pushed onto the resilient return means 900, 9, by a support spring 13 carried by the spring control lever 12. This support pin 11 is arranged to be supported in a cantilevered manner on one or the other side of the edge 10, depending on the angular position of the spring control lever 12, in order to control a motion of the sliding wheel set 5 in a first direction or in a second direction opposite to the first direction, depending on the direction of the slide axis D1, for example by being supported in a groove 59 of the sliding wheel set 5.

More particularly, to impart rotational travel to the intermediate wheel 7, the control means 300 comprises a control element which is arranged to control a rotation of the spring control lever 12, and then to control a rotation of a rack 15 meshing with a rack lever 16. This rack lever 16 carries a control wheel 20 which is arranged to mesh or not to mesh, depending on the angular position of the rack lever 16, with a drive wheel 21 which is integral with the sliding wheel set 5 for rotation therewith.

More particularly, the first output wheel set 101 and the second output wheel set 102 are in constant rotation.

The invention can be used to display all kinds of variables.

More particularly, the first output wheel set 101 and the second output wheel set 202 are arranged to control the respective display, on at least one display means 800, 8, 28, of a first and a second indication, which are time indications.

One non-limiting example application of the invention is described hereinbelow for the display of two distinct time indications on the same display medium 800, in this case comprising an hour hand 28 and a minute hand 8.

More particularly, the first train 100 is driven by a first regulating member 1100, the second train 200 is driven by a second regulating member 1200, and this first regulating member 1100 and this second regulating member 1200 are arranged to operate continuously, independently of one another, and without user intervention, for the respective display of a first and of a second time indication, and respectively comprise a first input wheel set 1 and a second input wheel set 2 which are in constant rotation.

More particularly, this first regulating member 1100 and this second regulating member 1200 are regulated in a different way. In one specific case, the first regulating member 1100 is regulated to display a first time, and the second regulating member 1200 is regulated to display a second time. The control means 300 allows the user to display the time at will according to the first time or according to the second time, and the mechanism according to the invention allows the countdown of that of the two times not being displayed at the given moment in time to continue.

Figure 2:
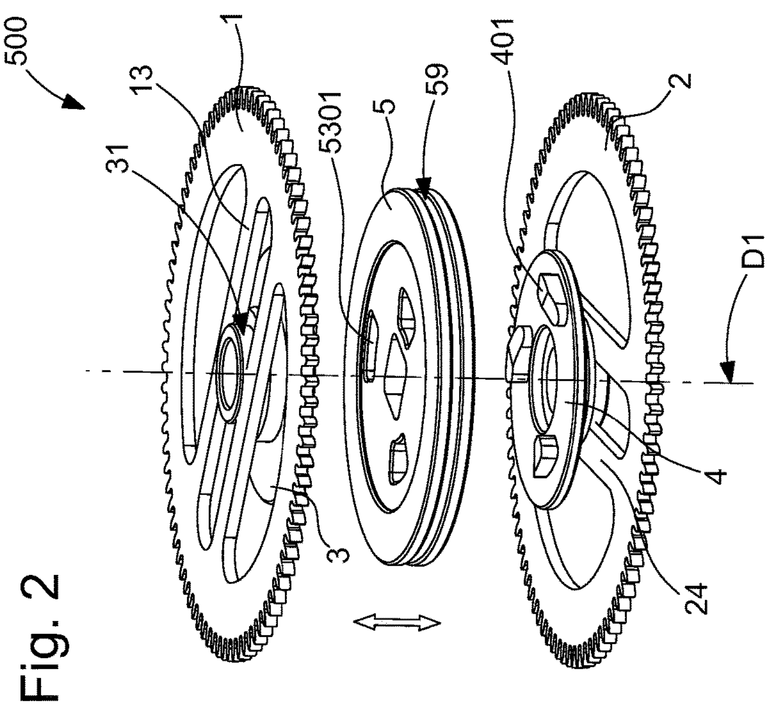
FIG. 2 diagrammatically shows a perspective view of a part of a switching and coupling mechanism, this part constituting a switching unit with two input wheel sets, both of which are coaxial, each driving, by friction, a hub comprising a coupling relief, which hubs frame a sliding wheel set which comprises, on each face, a complementary coupling relief which is arranged to cooperate, in a single angular position, with the coupling relief of the hub with which this sliding wheel set is engaged at a given moment in time; this sliding wheel set comprises a female square, allowing it to slide axially on an arbor with which it rotates as one; the sliding wheel set comprises an external groove allowing an external element such as a spring or a lever to exert an axial, descending or ascending force depending on the desired switching with the upper or lower hub in the figure.
Figure 5:
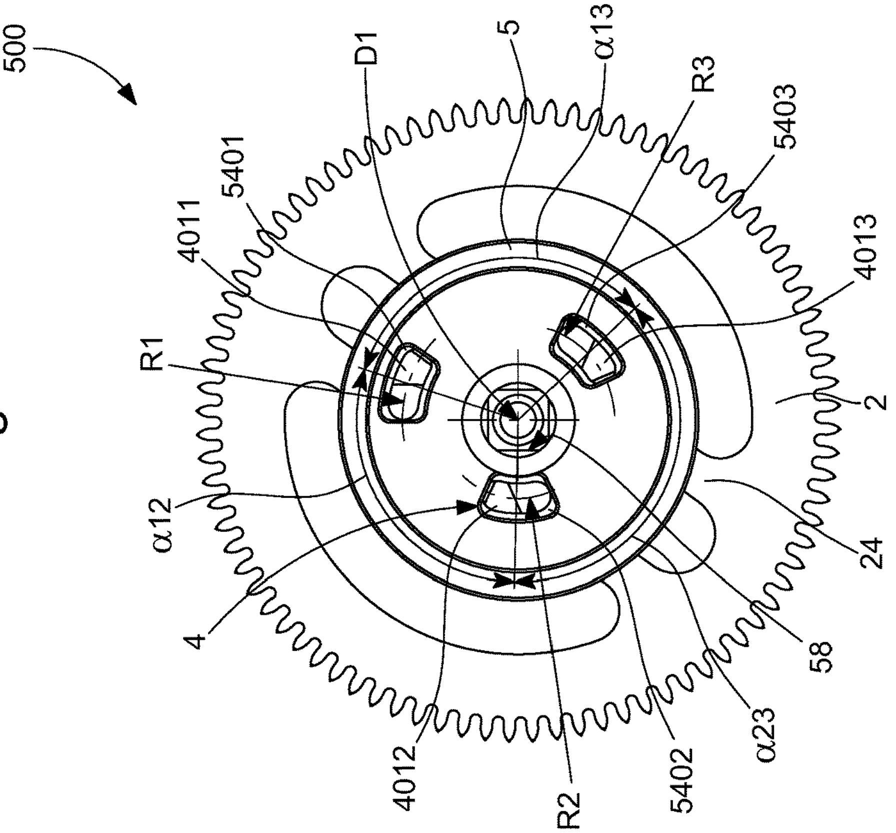
FIG. 5 diagrammatically shows a partial, top view of the lower part of the same switching unit, limited to the sliding wheel set and the arbor thereof, to the second lower hub, and to the second lower input wheel set, in the same position as in FIGS. 3 and 4; the complementary cooperating reliefs can be seen: the second hub respectively comprises a second coupling element, in the coupling position, with a second complementary coupling element comprised in the sliding wheel set; in this non-limiting embodiment, the sliding wheel set comprises a second complementary coupling element formed of three female reliefs, which are oblongs that are not at equal angular distances from one another, and which are placed on different radii relative to the slide axis; the second hub comprises a second coupling element formed of three male reliefs, in the form of posts with a sloping or radiating surface to facilitate meshing, these posts are disposed geometrically in the same manner as the three female reliefs of the sliding wheel set; this disposition guarantees a single cooperation position per revolution, and precise indexing; other compositions of male and female reliefs between the surfaces of the sliding wheel set and the antagonistic surfaces of the first hub and of the second hub can also be chosen while remaining within the scope of the invention.

FIG. 2 thus shows the switching and coupling mechanism 500 for the above example: the first train 100, dedicated to the first time, drives a first input wheel set 1 which is a first lower minute wheel; the second train 200, dedicated to the second time, drives a second input wheel set 2 which is a second upper minute wheel. These notions of "lower" and "upper" do not attribute any priority, and are only used to distinguish the two mechanisms by name. The first input wheel set 1 is frictionally connected to a first hub 3, and the second input wheel set 2 is frictionally connected to a second hub 4. The first hub 3 and the second hub 4 respectively comprise a first coupling element 301 and a second coupling element 401, in this case formed by protrusions extending in a direction parallel to that of the slide axis D1, and distributed over different diameters, as shown in FIG. 5; the distal part of these protrusions is sloping or radiating, to facilitate cooperation with grooves in the sliding wheel set 5. These grooves, which project in a plane perpendicular to the axis D1 complementary to the projections, constitute the first complementary coupling element 5301 and the second complementary coupling element 5401. These grooves can, of course, be coincident, on the two faces of the sliding wheel set 5, in order to simplify the manufacturing process. The interlocking cooperation between the first hub 3, or respectively the second hub 4, with the sliding wheel set 5 is only possible in a single position per 360° revolution, as shown in FIG. 5.

Figure 3:
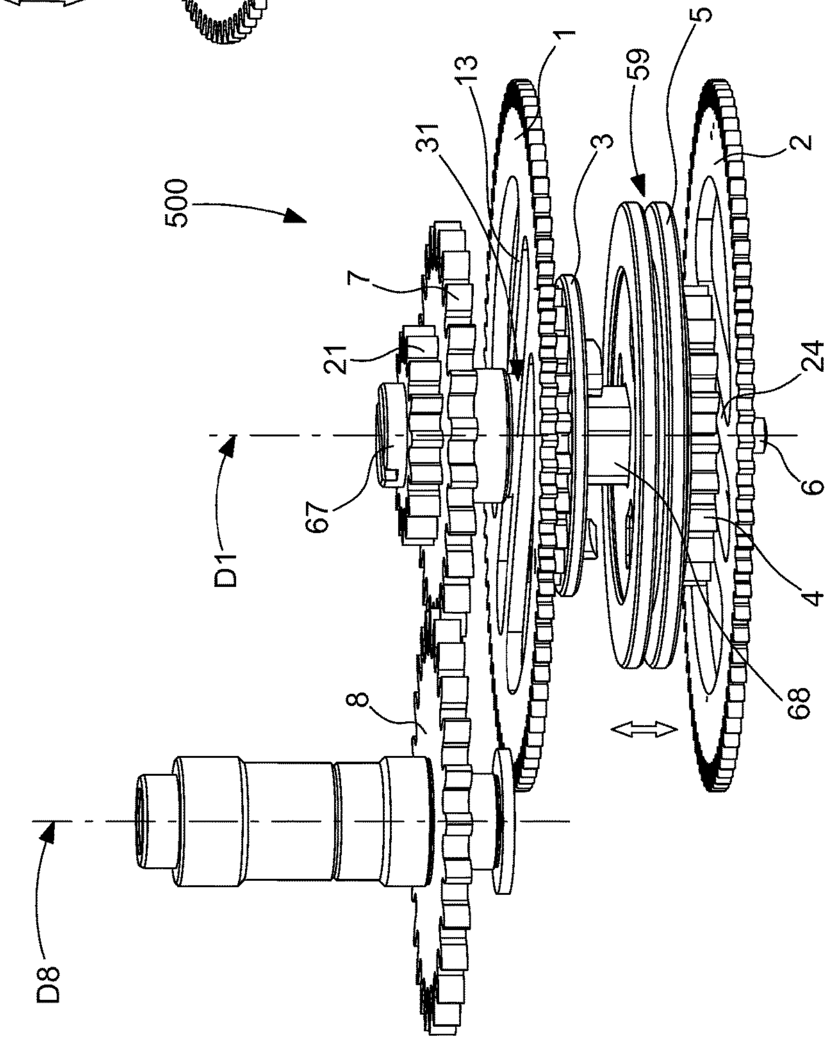
FIG. 3 diagrammatically shows a perspective view of the same switching unit, with the arbor carrying the sliding wheel set, this arbor carries, at the upper end thereof, an intermediate wheel, which in this case is engaged with a cannon-pinion in the non-limiting example shown, and a drive wheel which is arranged to cooperate with a control mechanism, comprised in the switching and coupling mechanism according to the invention, in order to cause the sliding wheel set to rotate in order to find an angular coupling position with that of the hubs towards which the sliding wheel set is pushed by the aforementioned lever or spring, which also belongs to this control mechanism; in this FIG. 3, the sliding wheel set is engaged with a second hub, in the lower position in the figure; the intermediate wheel thus transmits information from the second input wheel set, in the lower position in the figure, to the cannon-pinion.
Figure 4:
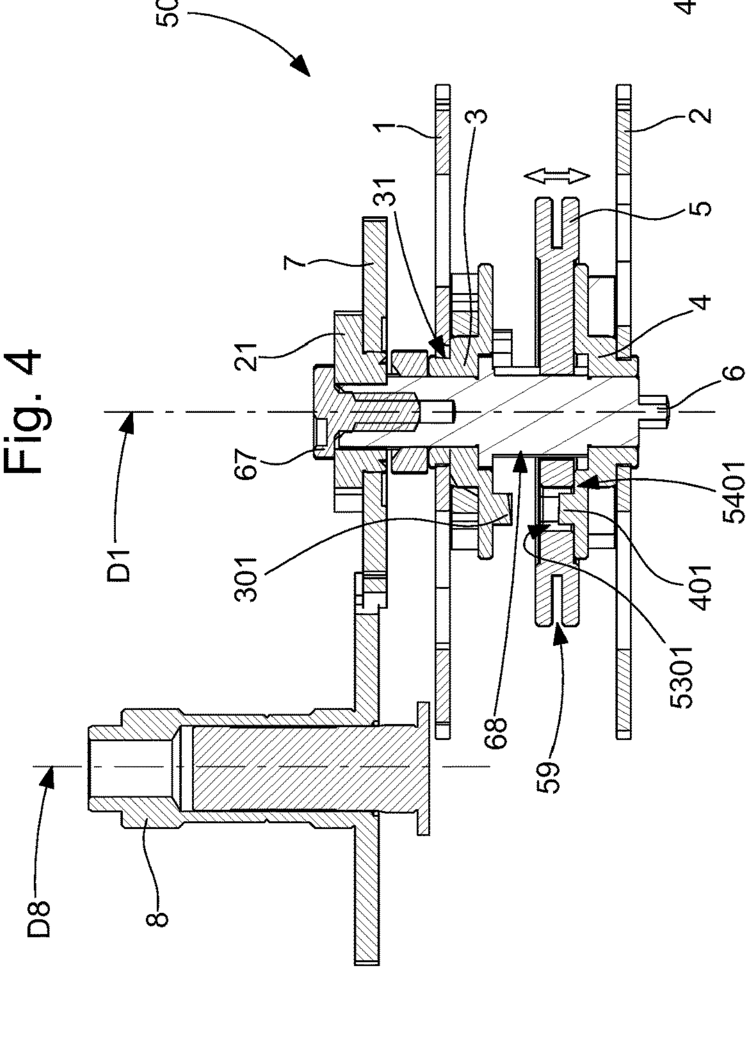
FIG. 4 diagrammatically shows a sectional view of the same switching unit in the same position as in FIG. 3; the sliding wheel set and the second lower hub can be seen in a position wherein they are coupled with one another, through the cooperation of the complementary reliefs thereof.
Figure 7:
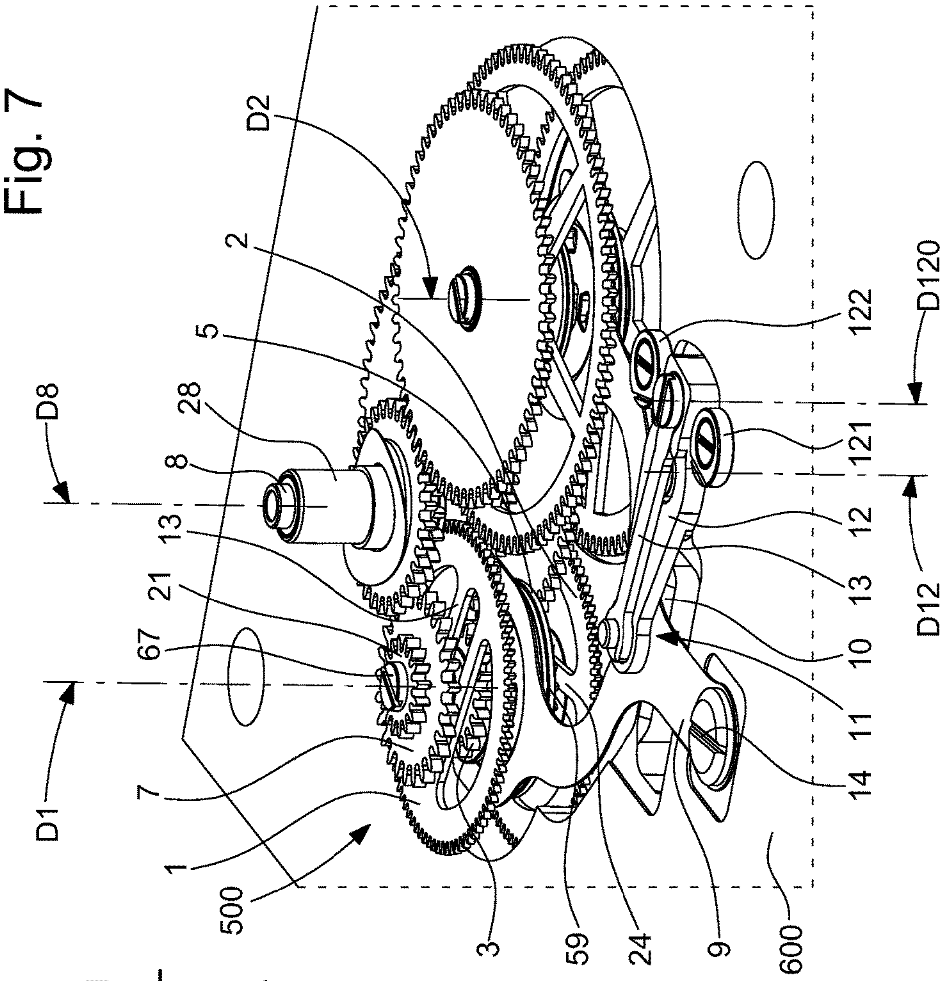
FIG. 7 diagrammatically shows a partial, perspective view of the horological mechanism according to the invention, which comprises a plate, and a control means, which comprises, in the foreground of the figure, a spring control lever, which is capable of pivoting between two bankings, and of which a support element, such as a support pin, exerts a force on a fork-shaped spring, mounted in the cantilever position from a rigid holding element, such as a stepped screw, visible in the foreground on the left of the figure; each leg of this spring is engaged with a groove in the sliding wheel set of a switching unit; the switching unit in FIGS. 2 to 6 is visible in the left-hand part of the figure, and concerns, in the present example, the switching of a minute display, by meshing with a cannon-pinion visible in the rear part of the figure; another similar switching unit is shown in the right-hand part of the figure, and concerns, in the present example, the switching of an hour display, by meshing with an hour wheel, in this case and non-restrictively coaxial with this cannon-pinion; the plate comprises a first cavity between the rigid spring-holding element and a supporting edge, and a second cavity beyond this supporting edge; it is understood that, depending on the angular position of the spring control lever and thus on the position of the support pin relative to the edge, the bending of the distal end of the spring, opposite the rigid spring-holding element and the supporting edge, is exerted in a first direction or in a second opposite direction, in a direction parallel to that of the slide axis.
Figure 6:
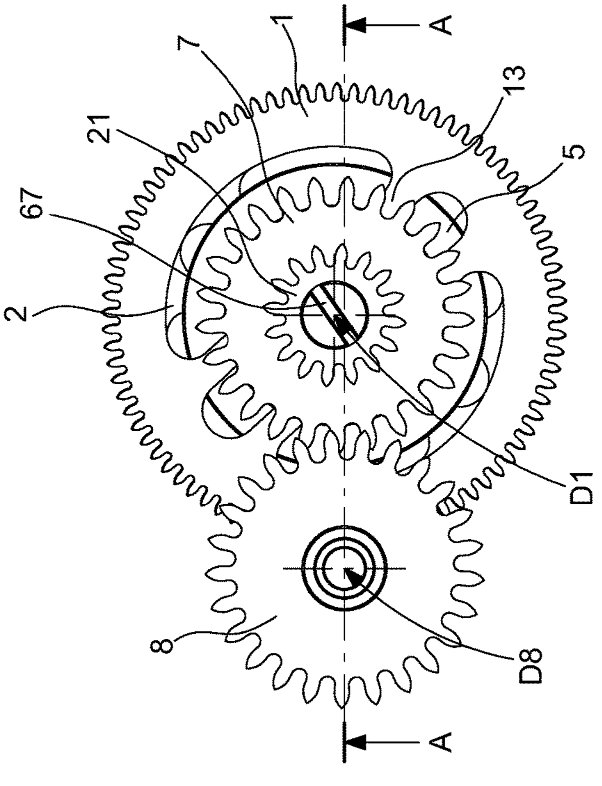
FIG. 6 diagrammatically shows a partial, top view of the same switching unit in the same position as in FIGS. 3 and 4.

The axial coupling in the direction of the slide axis D1 is easy to produce: the sliding wheel set 5 is capable of moving on the arbor 6 according to a square profile 68 visible in FIG. 3. This arbor 6 carries an intermediate wheel 7, which is thus integral with the sliding wheel set 5 for rotation therewith. This intermediate wheel 7 meshes with a cannon-pinion 8, pivoting about a display axis D8. The sliding wheel set 5 thus ensures the coupling between this cannon-pinion 8 and the hub 3 or 4, corresponding to the minute wheel 1 or 2, depending on the time information to be displayed. FIGS. 3 and 4 thus correspond to the display of the second time, and the sliding wheel set 5 must be slid upwards in the figure to display the first time.

Figure 8:
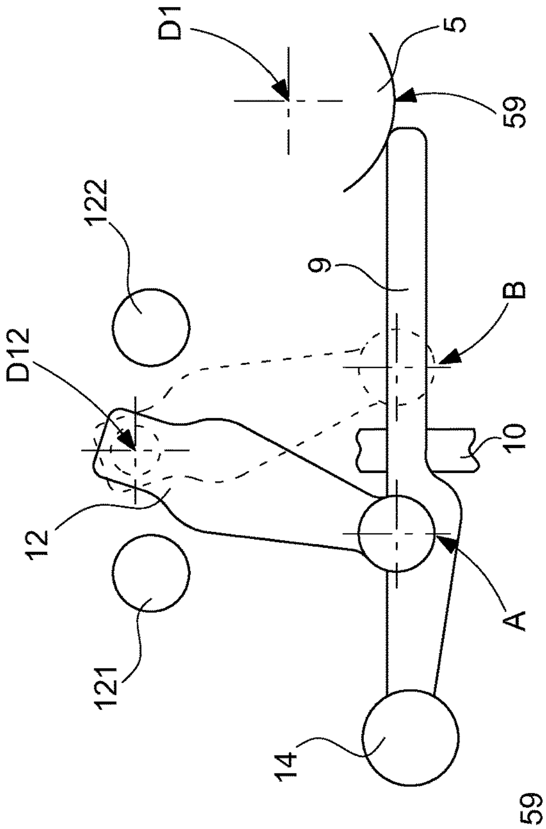
FIG. 8 very diagrammatically shows a partial, top view of the angular displacement of the spring control lever, which allows the position of the support pin to be varied relative to the edge: in a solid line between the rigid spring-holding element and the supporting edge, and in a broken line beyond this supporting edge.
Figure 9:
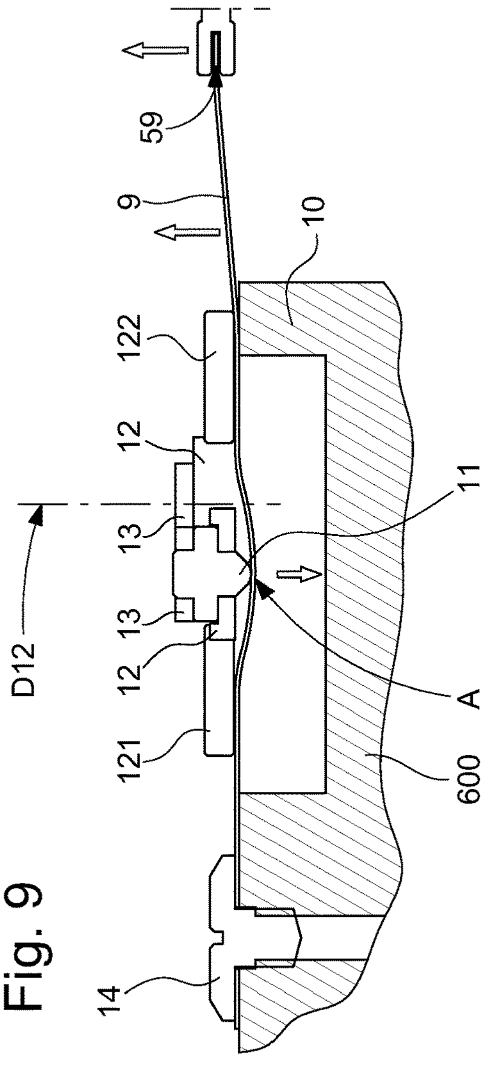
FIGS. 9 and 10 very diagrammatically show a partial, sectional view of the two positions in FIG. 8.
Figure 10:
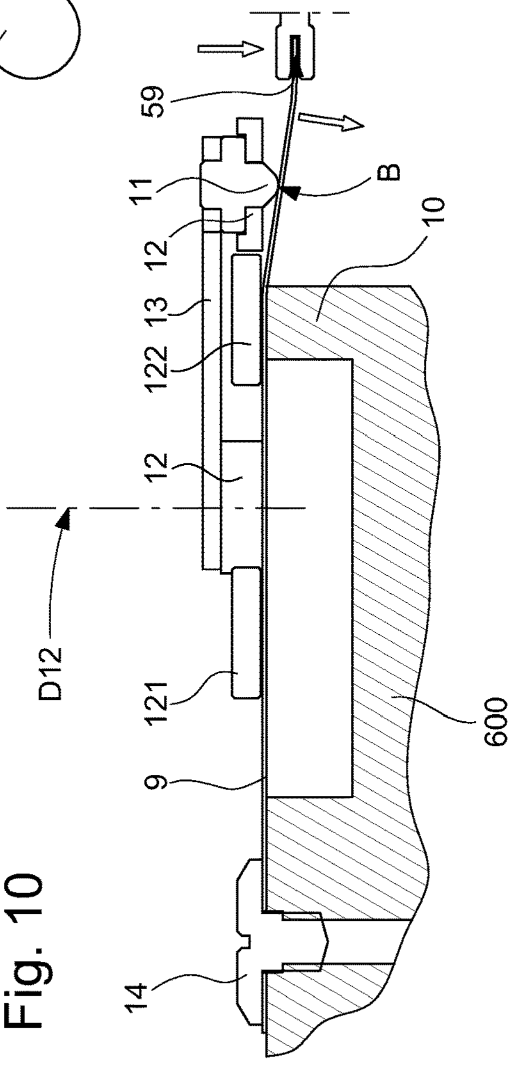
Figure 11:
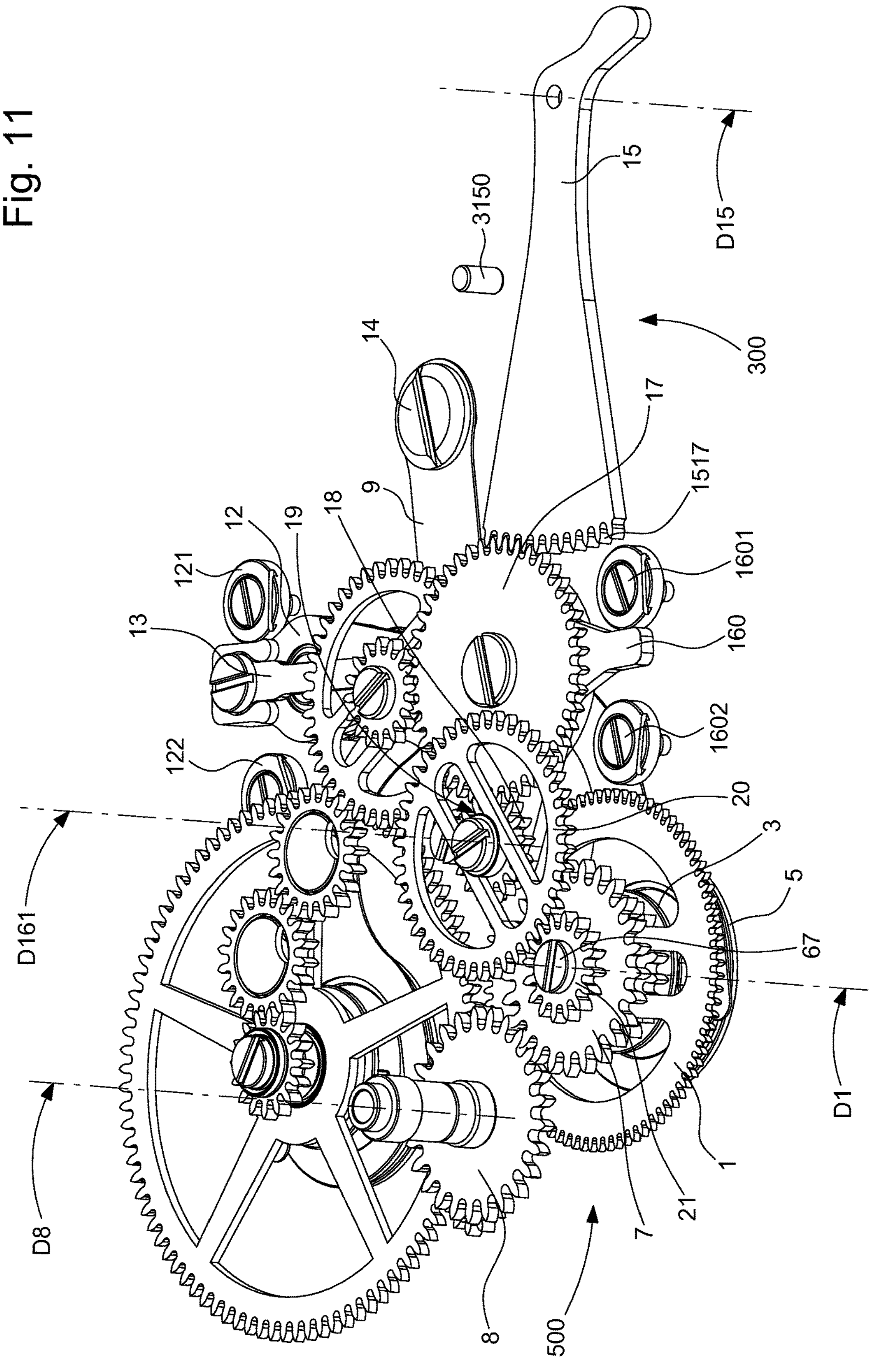
FIG. 11 diagrammatically shows a partial, perspective view of the horological mechanism according to the invention, in which another part of the control means is visible; whereas the part shown in FIGS. 7 to 10 fulfils a first function which consists of controlling an axial motion of the sliding wheel set of a switching unit, the spring control lever is visible at the rear and in the centre of the figure, and the spring support element is visible on the right of the figure; the new part of the control means shown here fulfils a second function which consists, once axial contact has been established between the sliding wheel set and the first or second hub, of imparting a rotary motion to the sliding wheel set in order to find the indexed position of synchronisation with this respective first or second hub; for this purpose, the control means comprises a rack, visible in the foreground and on the right of the figure, which controls the rotation of a rack lever, which carries wheel sets visible in the central part of the figure, in order to impart a rotation to a drive wheel integral such that it rotates as one with the sliding wheel set, visible beneath the fixing screw at the end of the arbor of the sliding wheel set; this succession of wheel sets comprises at least one spring allowing the angular travel of the rack to take place in one direction only, this rack being uncoupled after the drive wheel has been driven and the sliding wheel set has been brought into the coupling position with the respective first or second hub, which allows this rack to return to the rest position.
Figure 12:
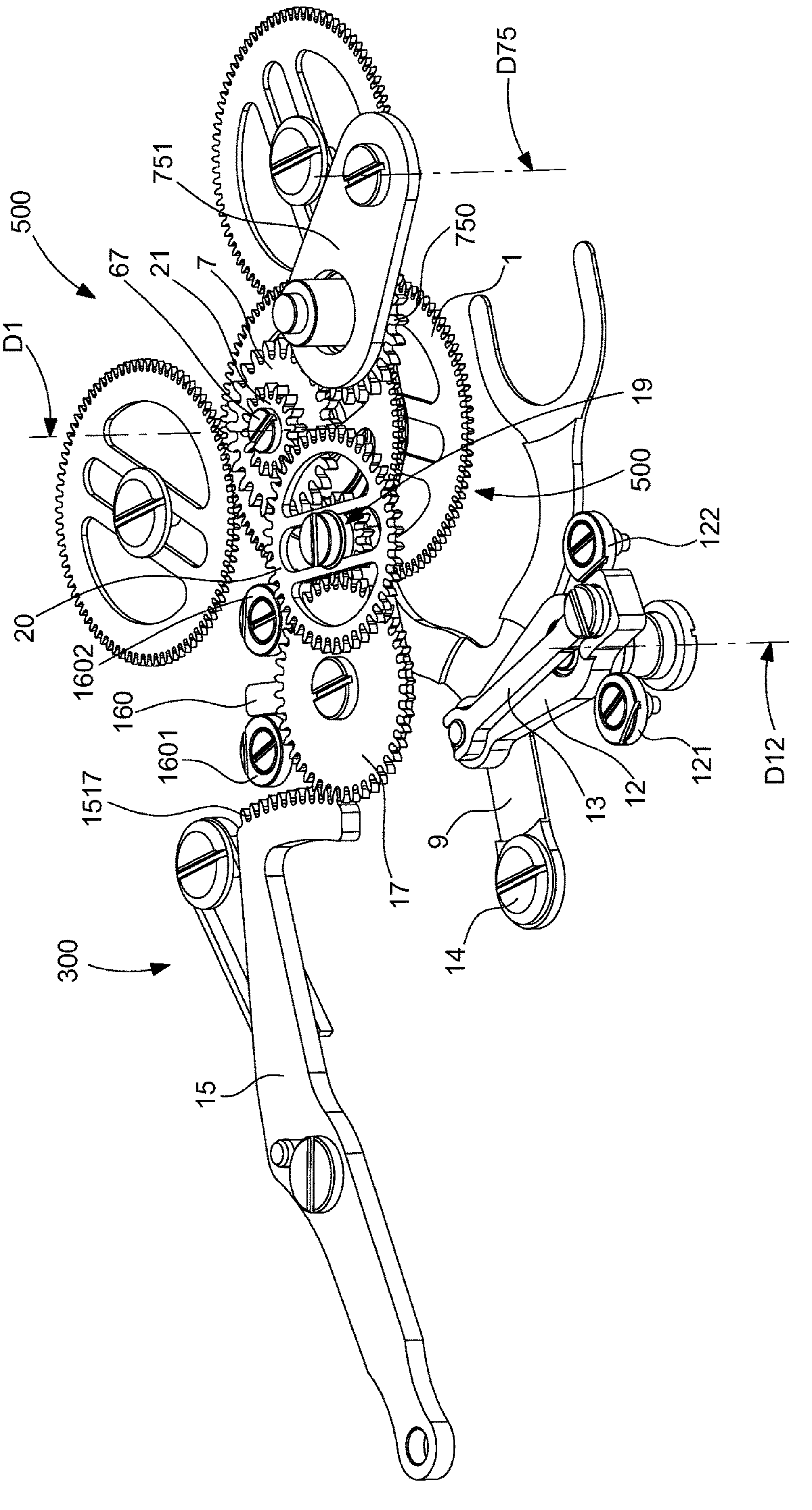
FIG. 12 diagrammatically shows a perspective, partial view, since some components are not shown, of the main elements of the control means.
Figure 13:
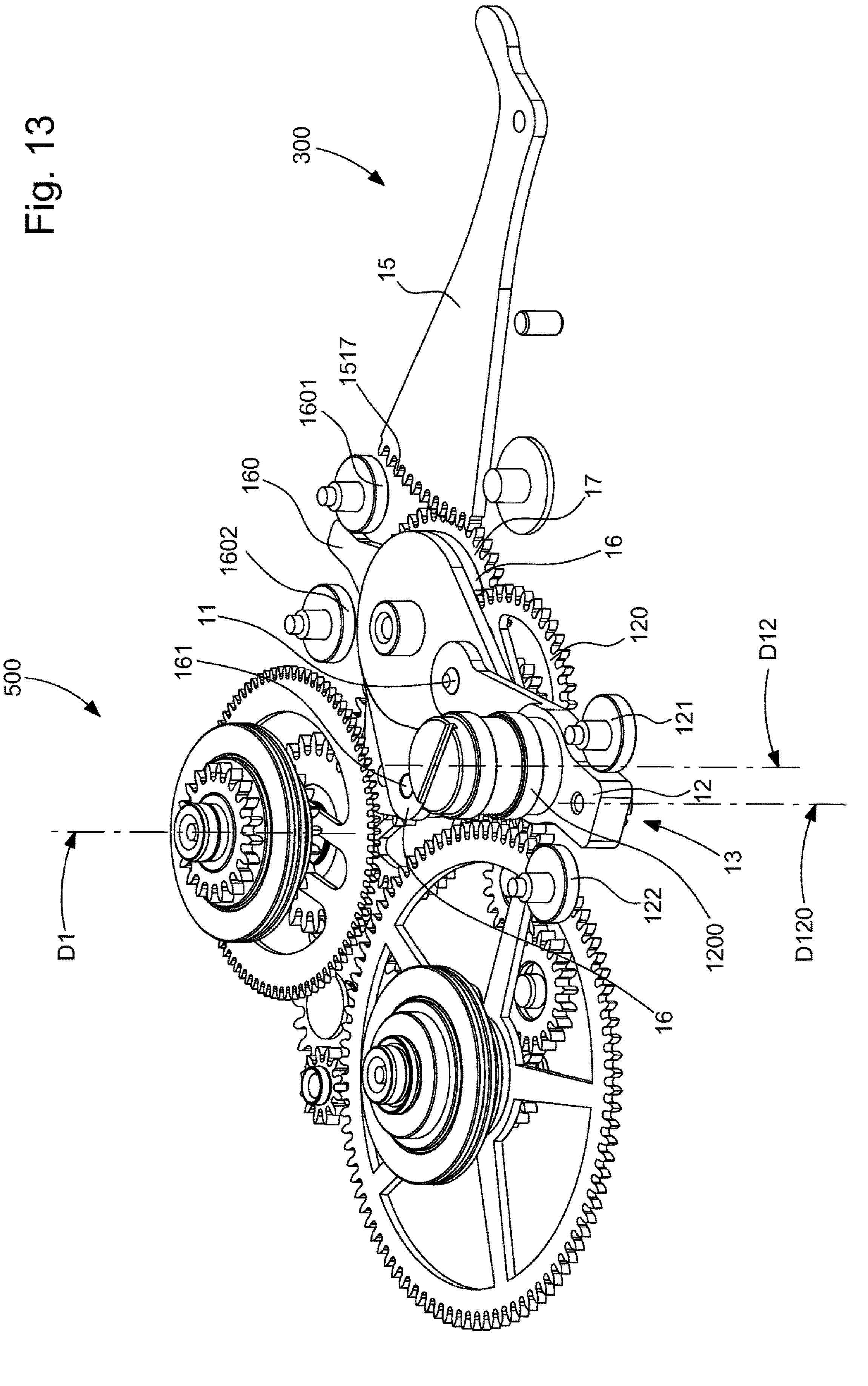
FIG. 13 diagrammatically shows a perspective, partial view, since some components, in particular the spring, are not shown, of the mechanism according to a view in which the rack lever is more clearly identifiable.
Figure 14:
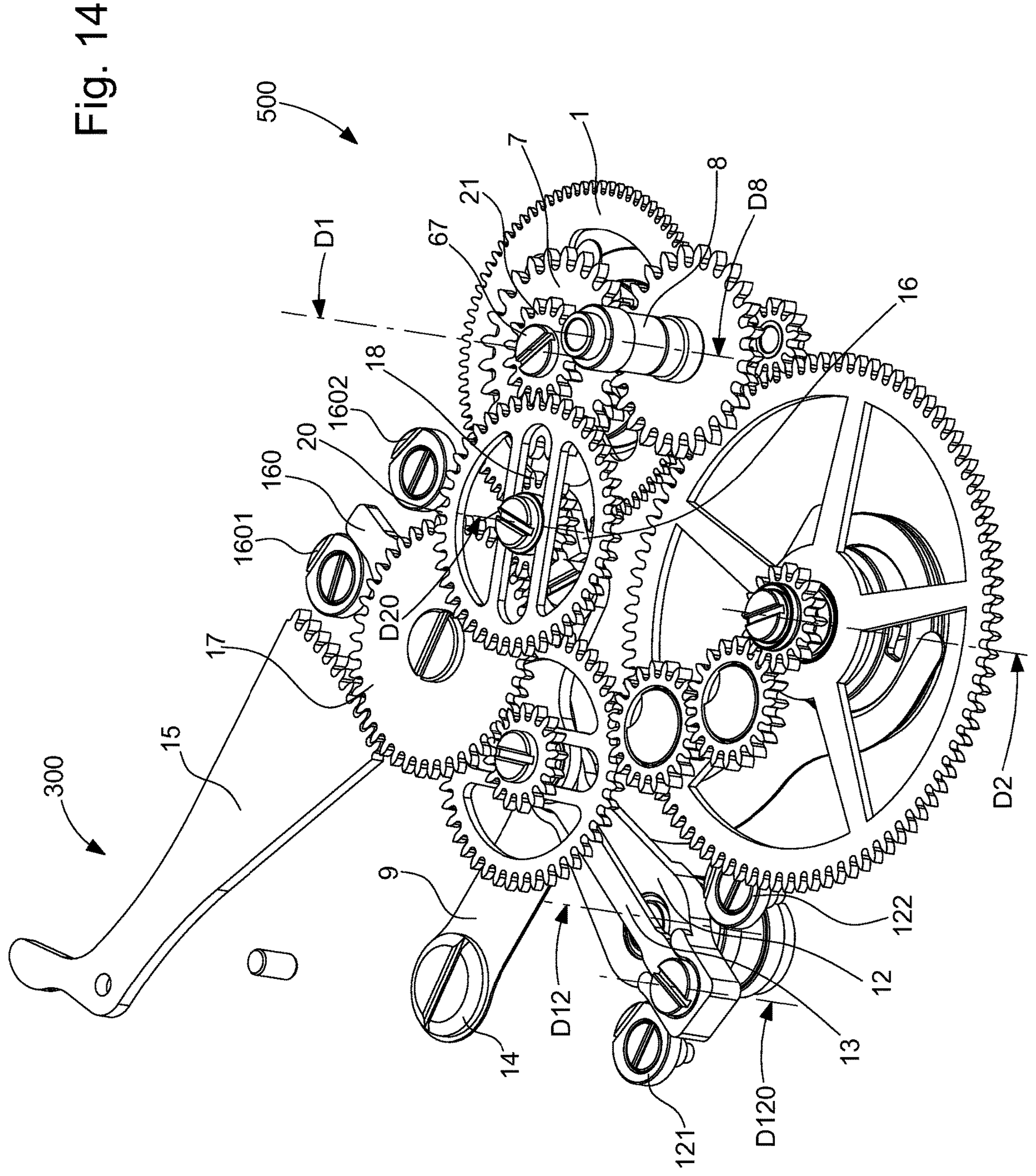
FIG. 14 diagrammatically shows a partial, perspective view of the same mechanism from a different angle.

FIGS. 8 to 10 more particularly show how a rotation imparted to the spring control lever 12, relative to a lever pivot axis D12, in particular between two travel limit bankings 121 and 122, enables the position of the cantilevered support pin 11 on one or the other side of the edge 10 to be modified, depending on the angular position of the spring control lever 12, in order to control a motion of the sliding wheel set 5 in a first direction or in a second direction opposite to the first direction in the direction of the slide axis D1. In FIG. 9, the point of support of the support pin 11 is located between the rigid holding element 14, for example a stepped screw, on the one hand, which fixes the main spring strip 9 to the structure 600, and the protruding edge 10 comprised in this structure 600 on the other hand; the sliding wheel set 5 is thus displaced axially upwards in the figure. In FIG. 10, the point of support of the support pin 11 is located outside the area delimited by the rigid holding element 14 and the edge 10, and bears against the cantilevered part of the main spring strip 9; the sliding wheel set 5 is thus axially displaced downwards in the figure.

However, the axial coupling alone is not sufficient, since the angular position of alignment between the sliding wheel set 5 and the hub 3 or 4 corresponding to the display to be produced must be found.

To this end, the control means 300 comprises means for driving the sliding wheel set 5 such that it rotates, arranged to impart thereto a rotation relative to the first hub 3, or respectively the second hub 4, towards which it is axially pushed, in order to find the single position of alignment over a rotation of less than or equal to 360°. FIGS. 11 to 15 show a non-limiting example embodiment that is characterised by a small thickness, which is advantageous in order to integrate other complications in the timepiece.

Figure 18:
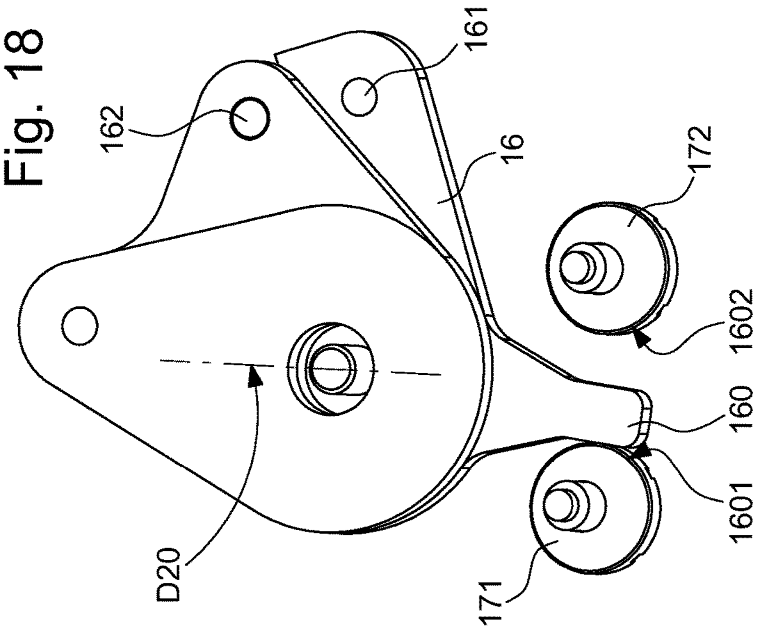
FIG. 18 diagrammatically shows a perspective view of the rack lever and its bankings for limiting angular travel.
Figure 19:
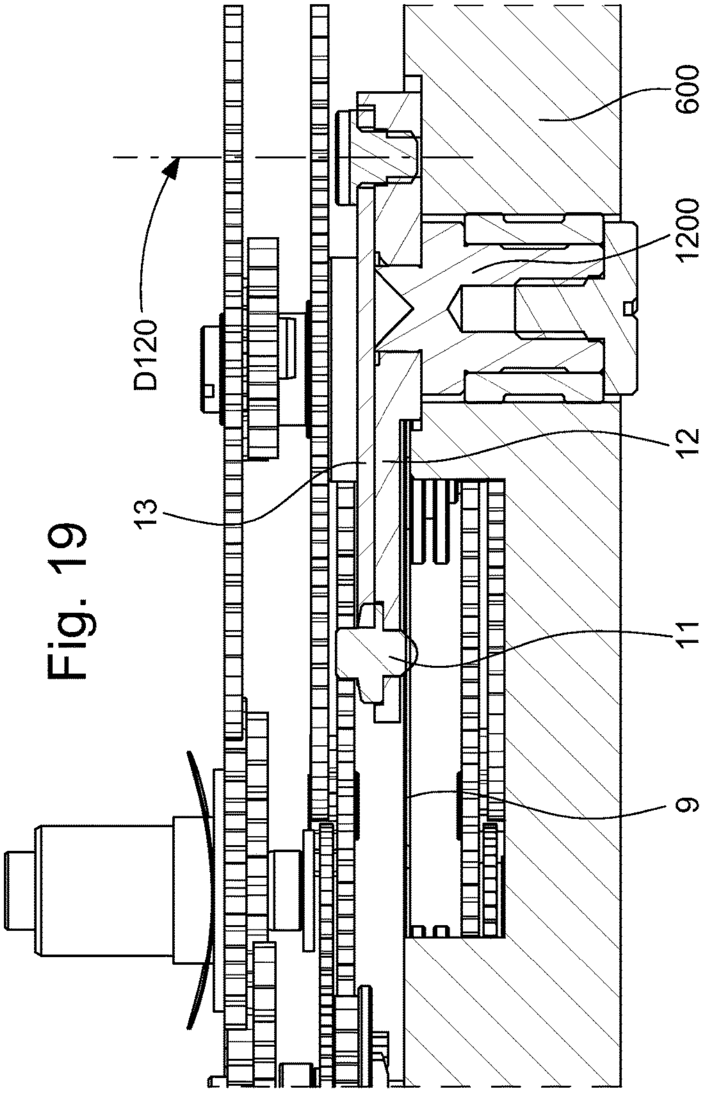
FIG. 19 diagrammatically shows a sectional view of the spring control lever and its guidance in the plate.
Figure 20:
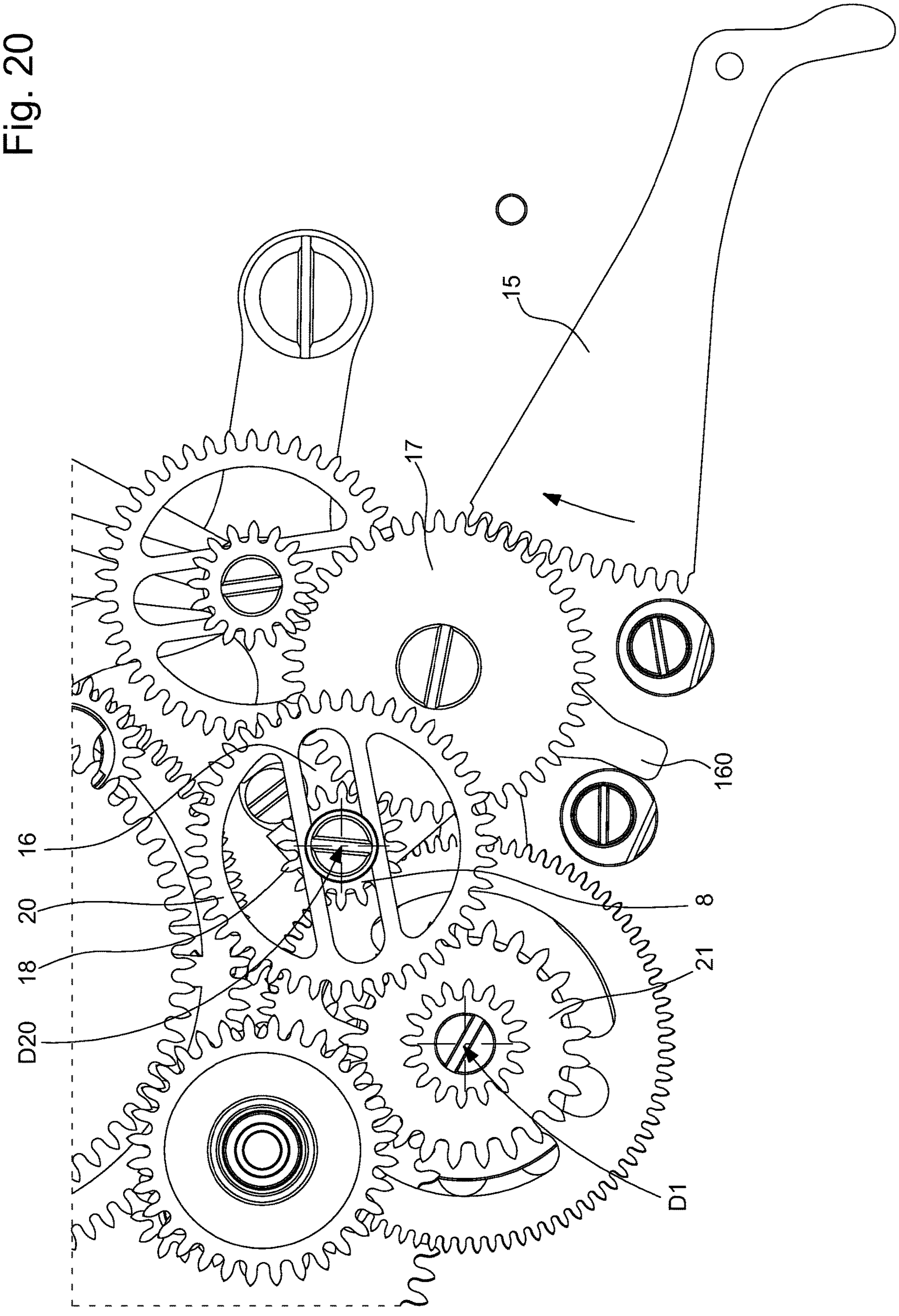
FIG. 20 diagrammatically shows a top view of a feature of the rack, of the rack lever and of the wheel sets carried thereby, in the position in which the rack starts its angular travel.
Figure 21:
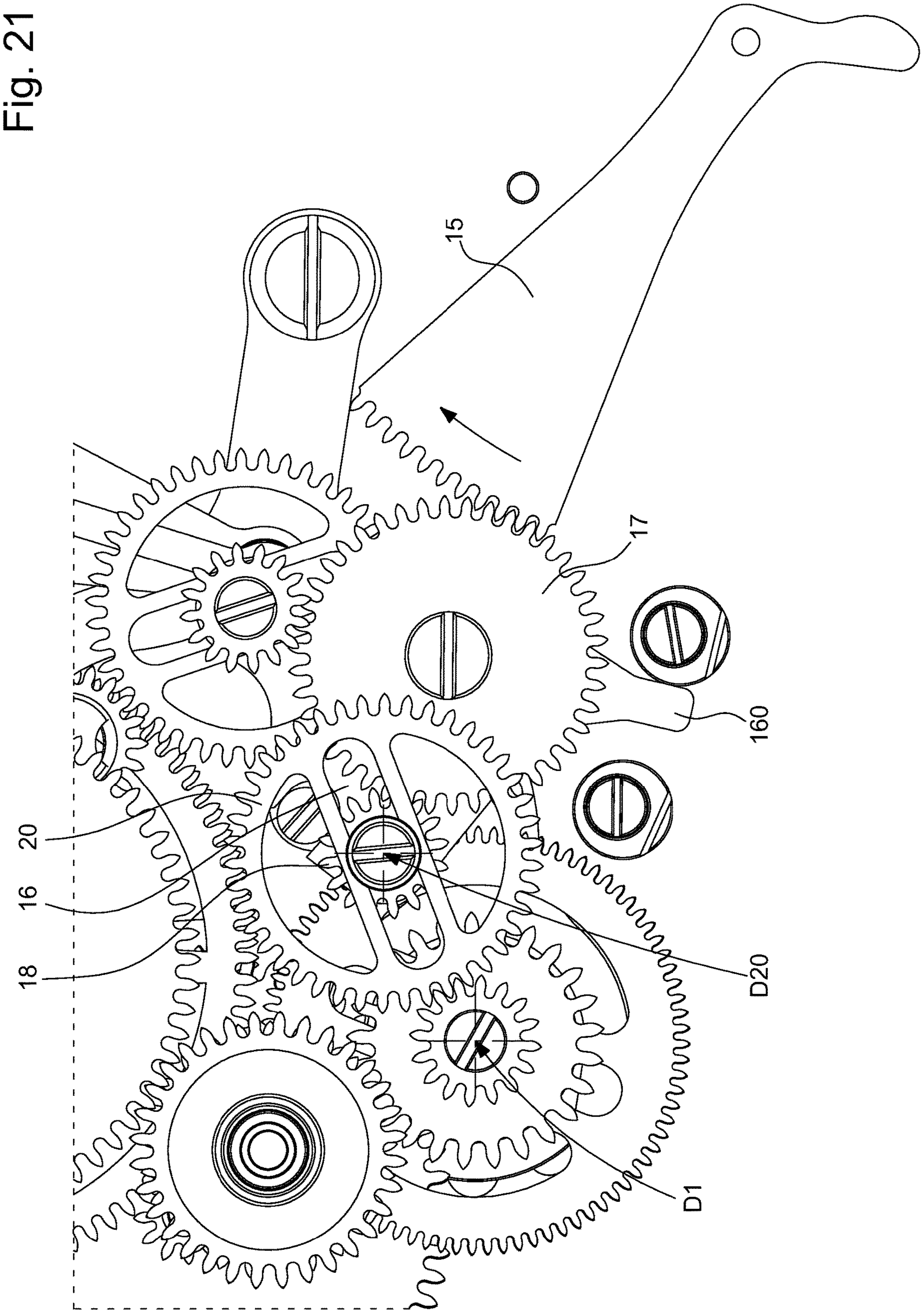
FIG. 21 diagrammatically shows a top view of a feature of the rack, of the rack lever and of the wheel sets carried thereby, in the position in which the rack ends its angular travel.
Figure 22:
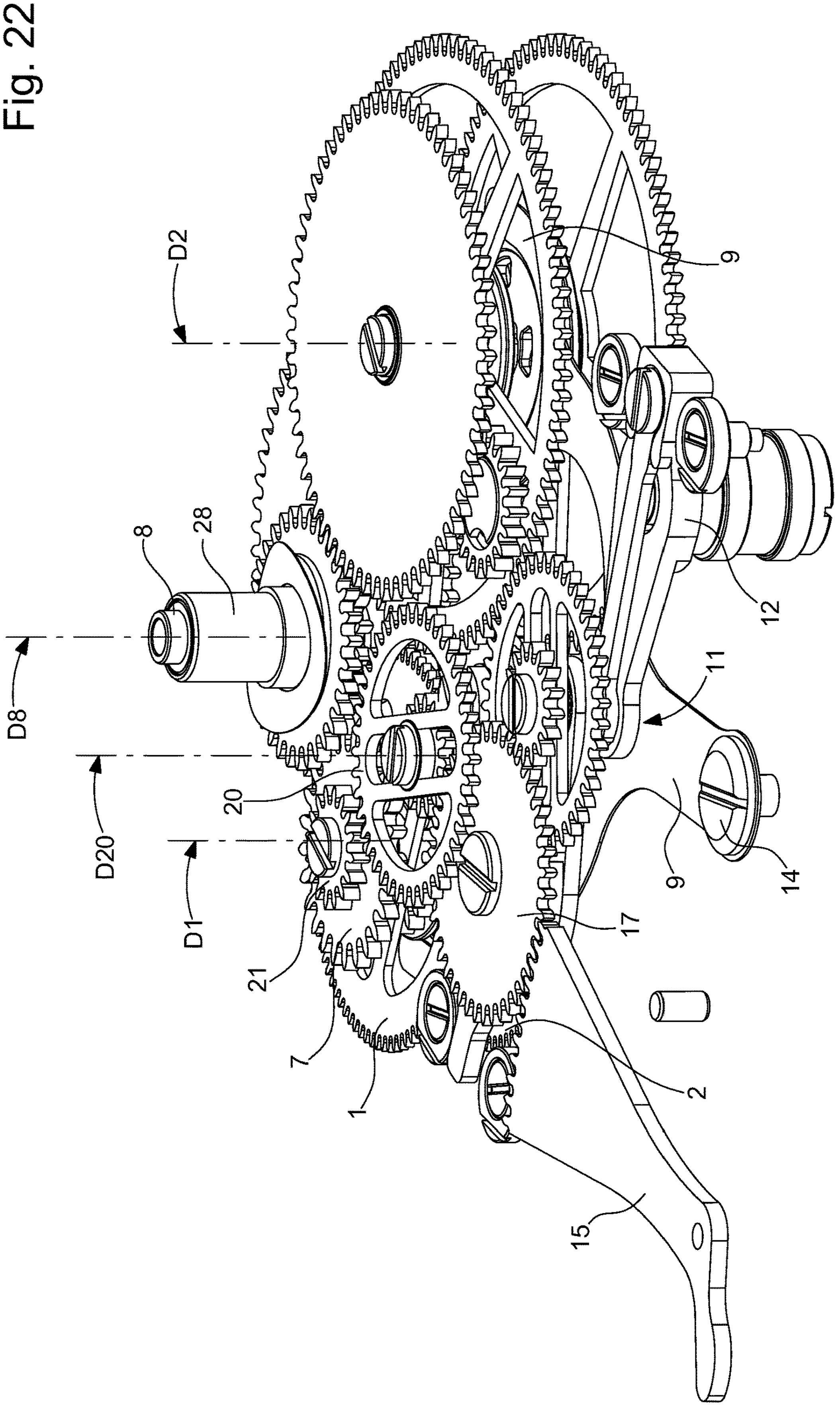
FIG. 22 diagrammatically shows a perspective view of a feature of the mechanism, in the position in which the rack starts its angular travel according to FIG. 20.
Figure 23:
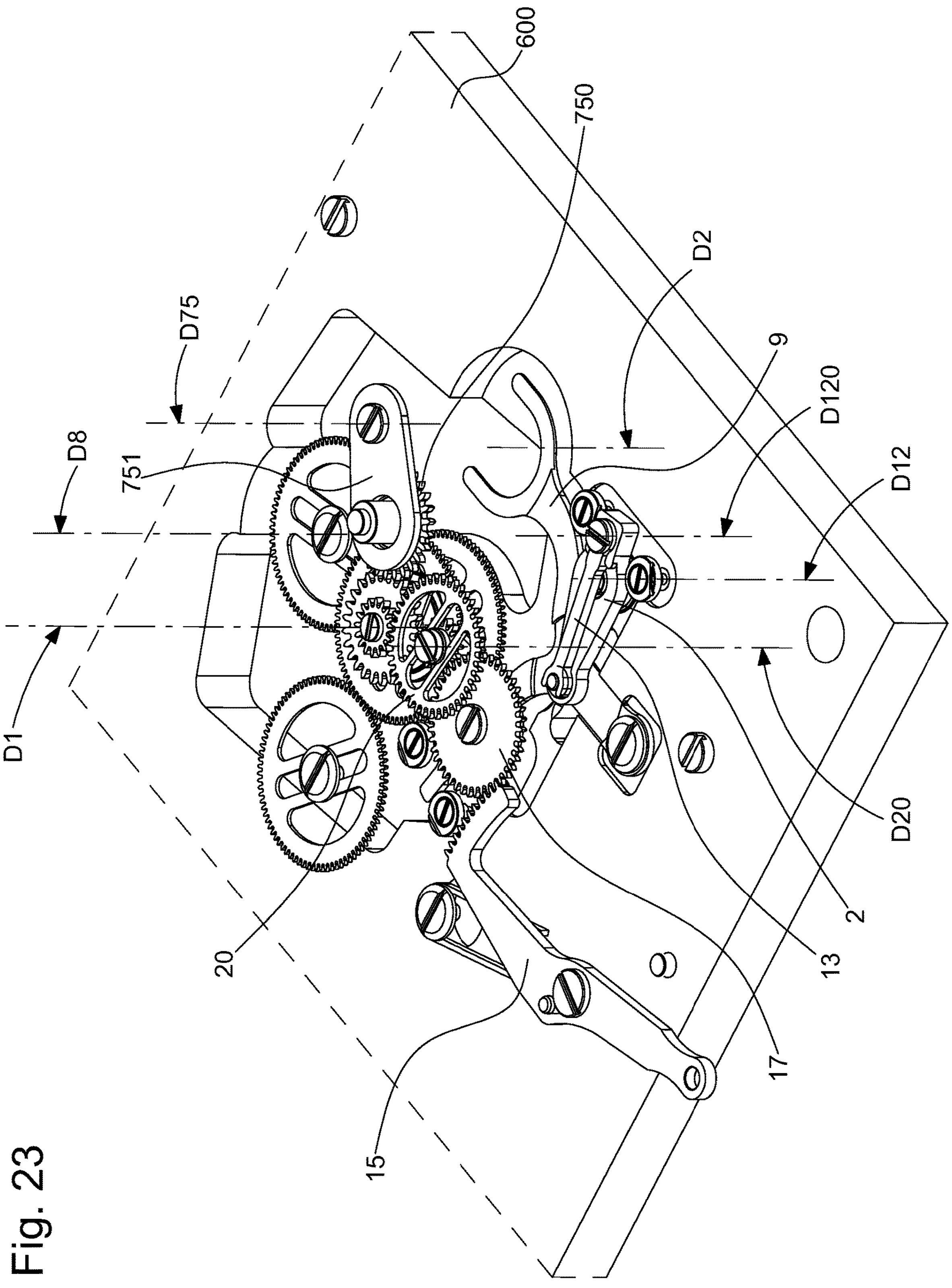
FIG. 23 diagrammatically shows a perspective view, from another angle, of a feature of the mechanism in the position in which the rack starts its angular travel according to FIG. 20; one of the switching units is removed so as to show the shape of the spring in the area in which it cooperates with a sliding wheel set.
Figure 25:
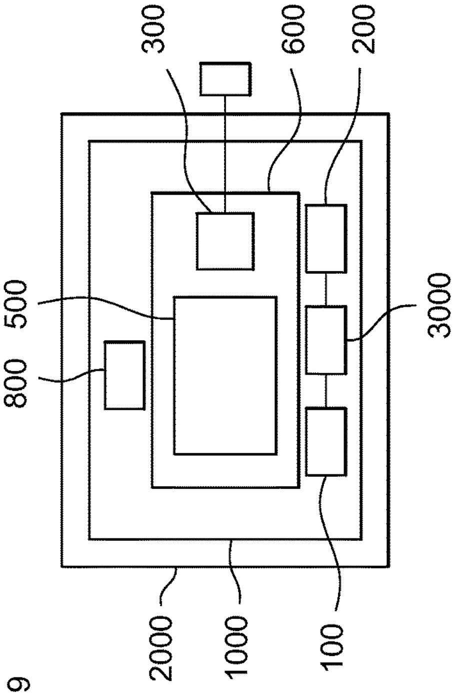
FIG. 25 is a block diagram showing a timepiece, in particular a watch, comprising a mechanism according to the invention, comprising at least one such horological mechanism, which comprises a structure carrying the switching and coupling mechanism as well as the control means, which comprises a control member that can be operated by the user. This horological mechanism comprises energy storage means, which are arranged to supply energy to the first and/or second mechanism. In this case, the third mechanism is the display mechanism.
Figure 24:
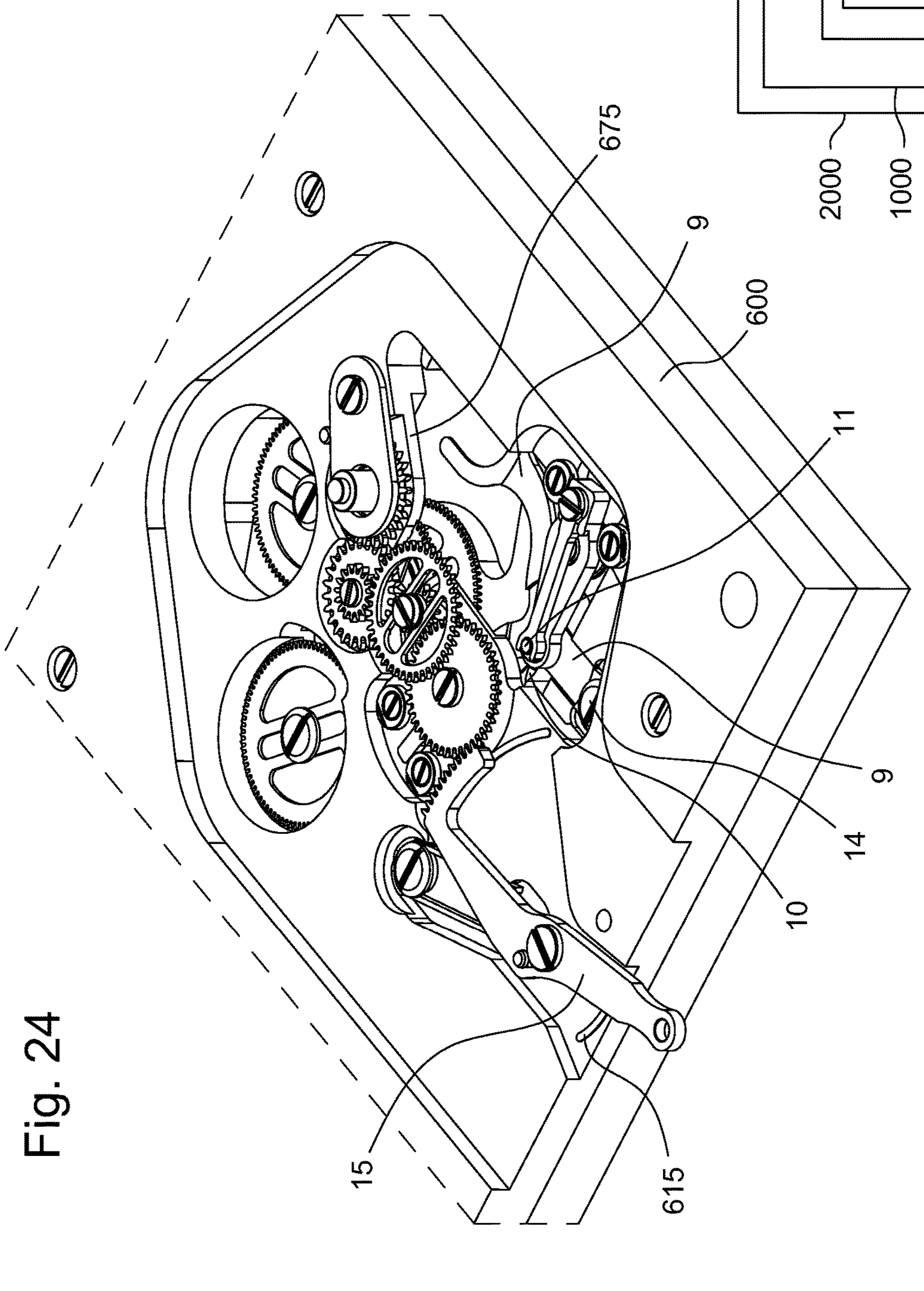
FIG. 24 diagrammatically shows a perspective view, from another angle, of the insertion of a part of the complete mechanism into two levels of the plate, occupying a minimal amount of space.

As set out above, the control means 300 comprises a control element, which is arranged to control rotation of the spring control lever 12, and then to control rotation of a rack 15 meshing with a lever wheel 17, which is integral with a rack lever 16, thereby enabling the rack lever 16 to be pivoted about the axis of the lever wheel 17. This rack 15 only works in one direction of rotation and is spring loaded. The lever wheel 17 meshes with a control pinion 18, which is also carried by the rack lever 16. The control pinion 18 in this case is coaxial along an axis D20 with a control wheel 20, to which it is connected by a balance spring 19. This control wheel 20 is frictionally mounted on the arbor thereof. As seen in FIG. 18, the rack lever 16 advantageously comprises an arm 160 capable of moving between two angular travel limit bankings 1601, 1602, the position of each thereof preferably being capable of being regulated by an eccentric. This FIG. 18 shows the recesses 161 and 162 of the different wheel sets carried by the rack lever 16. The control wheel 20 is thus arranged to mesh or not mesh, depending on the angular position of the rack lever 16, with a drive wheel 21, also shown in FIGS. 3, 4, 6 and 7, which is integral with the sliding wheel set 5 such that it rotates therewith about the slide axis D1. In this way, rotational travel can be imparted to the intermediate wheel 7. The latter is held on the arbor 6 of the sliding wheel set 5 by a screw 67.

Referring back to the specific case of displaying the first time or the second time, the sequence of switching the display from an indication of the second time to an indication of the first time takes place as follows: the spring control lever 12 pivots clockwise and acts on the main spring strip 9 as in FIG. 9, to cause the sliding wheel set 5 to escape from the second hub 4, leaving it momentarily free to rotate only while axially pushing the sliding wheel set 5 towards the first hub 3; the rack 15 is then controlled to drive the lever wheel 17, and to pivot the rack lever 16, and drive the arbor 6 with which the sliding wheel set 5 is integral such that they rotate as one, by the train comprising the control pinion 18, the control wheel 20, and the drive wheel 21; the sliding wheel set 5 remains pushed against the first hub 3 by the action of the main spring strip 9, the sliding wheel set 5 is driven such that it rotates until it reaches the angular position of cooperation thereof with the first hub 3, the coupling between the first hub 3 and the sliding wheel set 5 authorises the end of the axial travel thereof, at the upper banking in the case in FIG. 4. The presence of the balance spring 19 allows the rack 15 to cover its entire travel, even after coupling between the first hub 3 and the sliding wheel set 5. After the rack 15 has completed its full angular travel, it is returned anti-clockwise to its rest position under the action of the lever wheel 17 when the rack lever 16 is pivoted, and the control wheel 20 is released from the drive wheel 21; the spring control lever 12 is held in position to keep the sliding wheel set 5 under the axial force and press it against the first hub 3.

Figure 15:
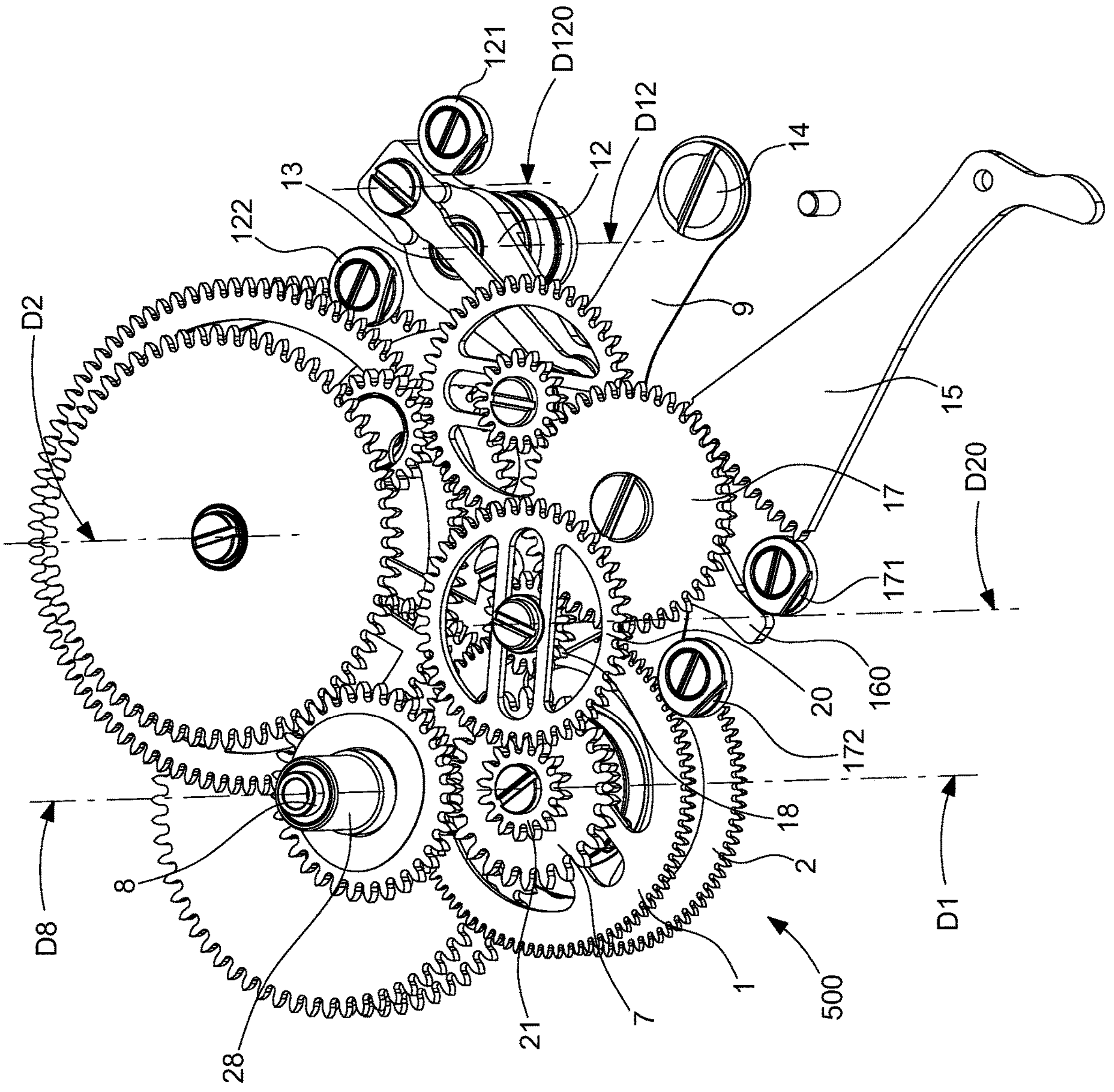
FIG. 15 diagrammatically shows a partial, perspective view of the same mechanism from a different angle, in which the minutes switching unit can be seen in the front left-hand part of the figure and the hours switching unit in FIG. 7 can be seen at the back and in the centre of the figure.
Figure 16:
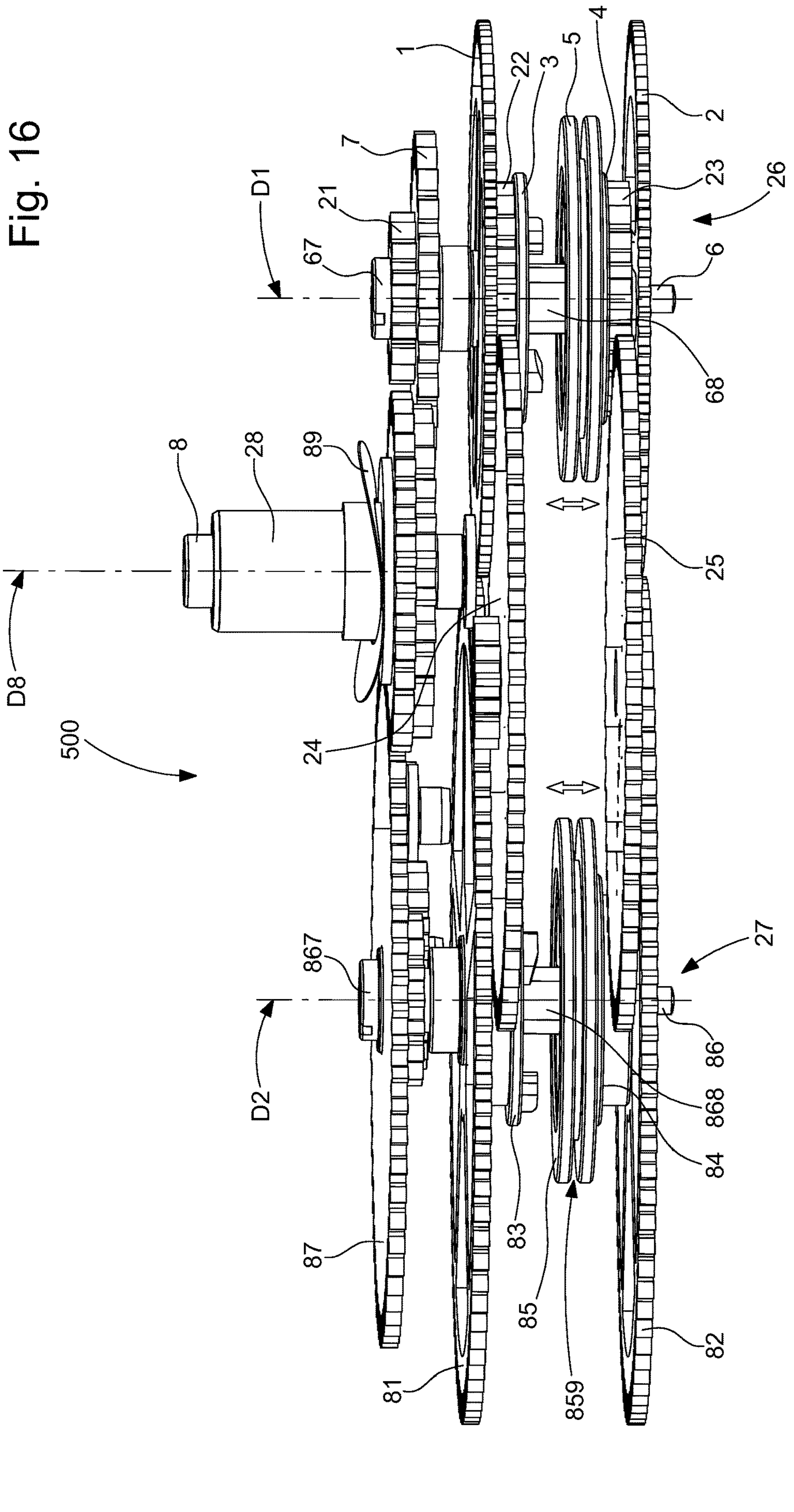
FIG. 16 diagrammatically shows a partial, perspective view of the functional combination of the minutes switching unit and of the hours switching unit from another angle close to a side view.
Figure 17:
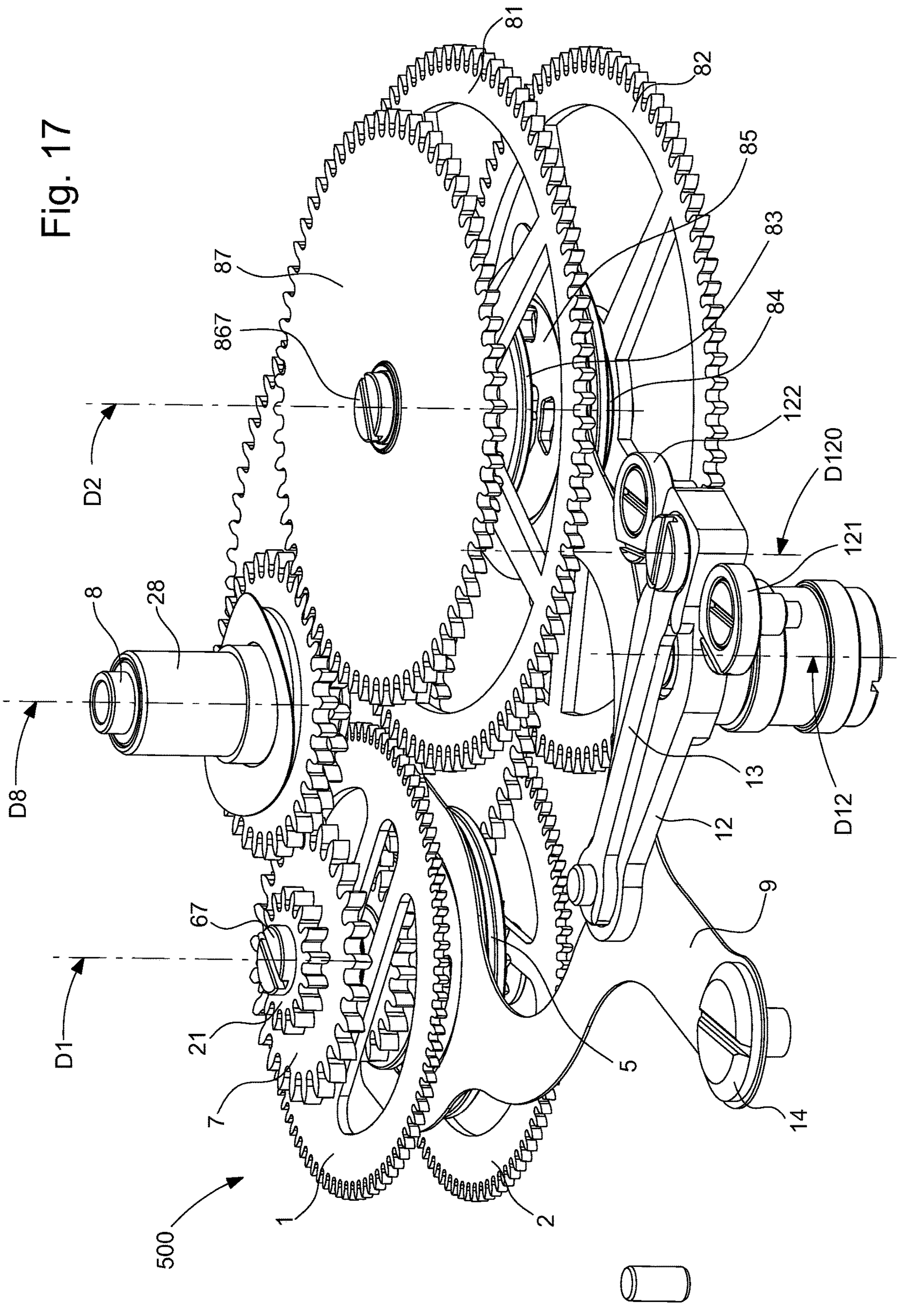
FIG. 17 diagrammatically shows a partial, perspective view of the functional combination of the minutes switching unit and of the hours switching unit from yet another angle; the two legs of the fork of the spring are clearly visible, inserted inside the grooves of the respective sliding wheel sets; the axial motion thereof is thus simultaneous.

FIGS. 15 to 17 show the extension of the above principle, to allow a plurality of time variables to be displayed on the basis of the minute display by a minute switching unit 26, shown in FIGS. 3 to 14; a similar structure involves an hour switching unit 27.

Similarly, the switching and coupling mechanism 500 comprises two secondary input wheel sets 91, 92. A secondary sliding wheel set 95 is capable of moving axially under constant strain between the two secondary input wheel sets 91, 92.

More particularly, the secondary sliding wheel set 95, comprising a groove 959, and the two secondary input wheel sets 91, 92 are coaxial around a secondary slide axis D2. More particularly, the secondary sliding wheel set 95 is a sliding coupling sleeve coaxial with, on the one hand, a first secondary hub 93 frictionally driven by the first secondary input wheel set 91, and on the other hand, a second secondary hub 94 frictionally driven by the second secondary input wheel set 92, and the first secondary input wheel set 91 or respectively the second secondary input wheel set 92 is arranged to drive the first secondary hub 93 or respectively the second secondary hub 94. All of the components of this set dedicated to switching the hour display are similar to those of the minutes, and the individual reference numerals are the same, preceded by the number "9". The connection between the minute switching unit 26 and the hour switching unit 27 is achieved by adding, to the minute switching unit 26, intermediate transfer wheels 22 and 23 integral with the first hub 3 and with the second hub 4 respectively, and transition wheels 24 and 25, which engage the first secondary hub 93 and the second secondary hub 94 respectively. A secondary arbor 96 carries a secondary intermediate wheel 97, held by a secondary screw 967, and which engages an hour wheel 28, which in this case is coaxial with the cannon-pinion 8. In the non-limiting embodiment shown in FIG. 17, the main spring strip 9 is fork-shaped, and each of its legs act on the corresponding sliding wheel set 5, 95.

This first hub 3 and this second hub 4 respectively comprise a first coupling element 301 and a second coupling element 401, which are arranged to cooperate alternately in the coupling position, one at a time, with a first complementary coupling element 5301 or with a second complementary coupling element 5401 comprised in the sliding wheel set.

Moreover, the control means 300 is arranged to impart axial travel to the sliding wheel set 5 as far as abutment against the first hub 3 or respectively against the second hub 4, and to impart rotational travel to the sliding wheel set 5 to find the first coupling position between the sliding wheel set 5 and the first hub 3, or respectively the second hub 4, towards which it is pushed.

More particularly, the switching and coupling mechanism 500 comprises at least one resilient return means 900, 9, which is arranged to axially push the sliding wheel set 5 to abut against the first hub 3, or respectively the second hub 4, towards which it is pushed.

More particularly, the horological mechanism 1000 comprises energy storage means 3000, which are arranged to supply energy to the first regulating member 1100 and the second regulating member 1200.

More particularly, the energy storage means 3000 comprise a common energy source arranged to supply energy simultaneously to the first regulating member 1100 and the second regulating member 1200.

More particularly, one of either the first regulating member 1100 and second regulating member 1200 comprises an oscillator arranged to oscillate at a maximum frequency, and the other comprises an oscillator arranged to oscillate at a minimum frequency. More particularly, the maximum frequency is less than or equal to ten times the minimum frequency.

Switching between a first and a second display indication on the same display medium, such as a conventional hands display shown in FIG. 1, requires three phases: uncoupling the first train corresponding to the first display indication, finding synchronisation with the second train corresponding to the second display indication, then coupling the second train. These three phases are carried out through the two functional mechanisms:

- axial coupling, which allows each train to be coupled and uncoupled to and from the sliding wheel set;
- the rotational driving mechanism, which allows for the input of new information to be displayed;

The invention further relates to a timepiece 2000, in particular a watch, comprising at least one such horological mechanism 1000.

The invention claimed is:

1. A horological mechanism, comprising:

- a first mechanism comprising a first output wheel set capable of pivoting;
- a second mechanism comprising a second output wheel set capable of pivoting, the position of said first output wheel set being associated with a first input variable, and the position of said second output wheel set being associated with a second input variable, whereby said first mechanism and said second mechanism are arranged to control, each in turn, the motion of a third mechanism, and the driving of at least a third output wheel set comprised in said third mechanism;
- a switching and coupling mechanism arranged for coupling between said first mechanism or said second mechanism, which constitute two inputs each operating continuously, and said third mechanism constituting an output; and
- control means operable by a user to uncouple the mechanism from among said first mechanism and second mechanism that is engaged with said third mechanism, and to engage the other from among said first mechanism and second mechanism with said third mechanism,
- wherein said switching and coupling mechanism couples, in a single angular position per revolution said first mechanism or said second mechanism, and said third mechanism, said switching and coupling mechanism allowing for coupling solely in said single angular position, and
- wherein said switching and coupling mechanism comprises a structure, which comprises a raised edge, with which a strip comprised in said control means cooperates via an abutment in order to modify the position of a sliding wheel set comprised in said switching and coupling mechanism.

2. The horological mechanism according to claim 1, wherein said mechanism comprises said switching and coupling mechanism to produce a switchable display, wherein said third mechanism is a display mechanism for a respective display, on demand, on said at least one third output wheel set, which is a display means, of a first indication or a second indication characteristic of said first input variable or of said second input variable.

3. The horological mechanism according to claim 1, wherein said first mechanism is a first train comprising said first output wheel set, and wherein said second mechanism is a second train comprising said second wheel set, which are arranged to control a respective, alternating display, on at least one display means, of a first and of a second indication specific to the first train and to the second train respectively, wherein said switching and coupling mechanism comprises two input wheel sets, each constituted by said output wheel set, or driven directly by said output wheel set, and wherein said sliding wheel set is capable of moving axially under constant strain between said two input wheel sets, and said sliding wheel set is arranged to cooperate alternately and exclusively with either one of said two input wheel sets, selected under an action of a command imparted by a user to said control means, to establish a driving connection between said input wheel set engaged with said sliding wheel set at a given moment in time, with said display means, to produce a switchable display.

4. The horological mechanism according to claim 3, wherein said first output wheel set and said second output wheel set are in constant rotation.

5. The horological mechanism according to claim 3, wherein said first output wheel set and second output wheel set are arranged to control the respective display, on at least one said display means, of at least a first and a second said indications, which are time indications.

6. The horological mechanism according to claim 3, wherein said first train is driven by a first regulating member, wherein said second train is driven by a second regulating member, and wherein said first regulating member and second regulating member are arranged to operate continuously, independently of one another, and without user intervention, for the respective display of at least a first and a second time indication, and respectively comprise a first input wheel set and a second input wheel set which are in constant rotation.

7. The horological mechanism according to claim 6, wherein said first regulating member and said second regulating member are regulated in a different way.

8. The horological mechanism according to claim 6, wherein one of said first regulating member and second regulating member comprises an oscillator arranged to oscillate at a maximum frequency, and the other thereof comprises an oscillator arranged to oscillate at a minimum frequency, and said maximum frequency is less than or equal to ten times said minimum frequency.

9. A timepiece comprising at least one horological mechanism according to claim 3.

10. The horological mechanism according to claim 3, wherein said sliding wheel set and said two input wheel sets are coaxial around a slide axis (D1), and wherein said sliding wheel set can be axially coupled with only one of said two input wheel sets at a time, by cooperation of complementary reliefs in a single relative angular position for each said input wheel set, and is held in a coupling position thereof by at least one spring or lever comprised in said control means, and which is arranged to control and then hold the axial position of said sliding wheel set, and wherein said control means is further arranged to impart rotational travel to said sliding wheel set, to find the first coupling position between said sliding wheel set and the wheel set towards which said sliding wheel set is pushed.

11. The horological mechanism according to claim 10, wherein said sliding wheel set is a sliding coupling sleeve coaxial with a first hub frictionally driven by said first input wheel set, and a second hub frictionally driven by said second input wheel set, and wherein said first input wheel set, or respectively said second input wheel set, is arranged to drive said first hub, or respectively said second hub, and said first hub and said second hub respectively comprise a first coupling element and a second coupling element, which are arranged to cooperate alternately in a coupling position, one at a time, with a first complementary coupling element or with a second complementary coupling element comprised in said sliding wheel set, and wherein said control means is arranged to impart axial travel to said sliding wheel set so as to abut against said first hub or respectively against said second hub, and to impart rotational travel to said sliding wheel set to find the first coupling position between said sliding wheel set and said first hub, or respectively said second hub, towards which said sliding wheel set is pushed.

12. The horological mechanism according to claim 11, wherein said switching and coupling mechanism comprises at least one resilient return means, which is arranged to axially push said sliding wheel set to abut against said first hub, or respectively said second hub, towards which said sliding wheel set is pushed.

13. The horological mechanism according to claim 12, wherein said at least one resilient return means is fixed to said structure via a rigid holding element, said at least one resilient return means comprises at least one main spring strip, which is supported on said edge comprised in said structure, and comprises a spring control lever, pivotally mounted and which can be operated by said control means, and which carries a support pin pushed onto said resilient return means by a support spring carried by said spring control lever, said support pin being arranged to be supported in a cantilevered manner on a side of said edge, depending on an angular position of said spring control lever, in order to control a motion of said sliding wheel set in a first direction or in a second direction opposite to said first direction, in the direction of said slide axis (D1).

14. The horological mechanism according to claim 11, wherein said first coupling element and said second coupling element are respectively a first claw element and a second claw element, which are arranged to alternately cooperate in a clawing position, one at a time, with said first complementary coupling element or with said second complementary coupling element, which are respectively a first complementary claw element and a second complementary claw element.

15. The horological mechanism according to claim 11, wherein said control means is arranged to impart rotational travel to an intermediate wheel integral with said sliding wheel set for rotation therewith, to find a coupling position between said sliding wheel set and said first hub or said second hub towards which said sliding wheel set is pushed.

16. The horological mechanism according to claim 15, wherein, in order to impart said rotational travel to said intermediate wheel, said control means controls a rotation of said spring control lever, and then controls a rotation of a rack meshing with a rack lever carrying a control wheel arranged to mesh or not to mesh, depending on an angular position of said rack lever, with a drive wheel integral with said sliding wheel set for rotation therewith.

17. The horological mechanism according to claim 11, wherein said sliding wheel set comprises, on a first face facing said first hub a first post or first groove, and on a second face facing said second hub a second post or a second groove, which are arranged to cooperate in a complementary manner in a single cooperation position during a relative rotation of less than or equal to 360°, during said rotational travel of said sliding wheel set.

18. The horological mechanism according to claim 11, wherein said sliding wheel set is mounted to slide on an arbor to cause, either directly or indirectly, said display means to rotate.

19. The horological mechanism according to claim 18, wherein said arbor is arranged to cause said display means to rotate, through a train incorporating said intermediate wheel, or through said intermediate wheel, which is rotationally indexed with said arbor.

* * * * *